United States Patent [19]
Piche et al.

[11] Patent Number: 6,047,221
[45] Date of Patent: Apr. 4, 2000

[54] METHOD FOR STEADY-STATE IDENTIFICATION BASED UPON IDENTIFIED DYNAMICS

[75] Inventors: Stephen Piche; James David Keeler; Eric Hartman; William D. Johnson, all of Austin; Mark Gerules, Cedar Park; Kadir Liano, Austin, all of Tex.

[73] Assignee: Pavilion Technologies, Inc., Austin, Tex.

[21] Appl. No.: 08/943,489

[22] Filed: Oct. 3, 1997

Related U.S. Application Data

[63] Continuation-in-part of application No. 08/643,464, May 6, 1999, Pat. No. 5,933,345.
[51] Int. Cl.$^7$ .............................................. G05B 13/02
[52] U.S. Cl. ................................ 700/44; 700/46; 700/71; 700/29; 327/185; 327/198; 399/77
[58] Field of Search ..................................... 327/198, 185; 399/77; 700/44, 46, 71, 29

[56] References Cited

U.S. PATENT DOCUMENTS

| | | | |
|---|---|---|---|
| 4,868,754 | 9/1989 | Matsumoto | 701/99 |
| 4,922,412 | 5/1990 | Lane et al. | 364/157 |
| 4,964,120 | 10/1990 | Mostashari | 370/228 |
| 5,251,285 | 10/1993 | Inoue et al. | 706/10 |
| 5,477,444 | 12/1995 | Bhat et al. | 700/48 |
| 5,781,432 | 7/1998 | Keeker et al. | 364/164 |

FOREIGN PATENT DOCUMENTS

| | | |
|---|---|---|
| 0 280 948 A1 | 2/1987 | European Pat. Off. . |
| WO 93/15448 | 8/1993 | WIPO . |
| WO 96/12990 | 5/1996 | WIPO . |

OTHER PUBLICATIONS

"Introduction to System Dynamics", Shearer, J.L., Murphy, A.T., and H.H., Richardson, Addison–Wesley, Reading, Massachusetts, 1967.

"System Identification", Eykhoff, P., John Wiley & Sons, New York, NY, 1974.

"Digital Signal Processing", A.V. Oppenheim and R.W. Schafer, Prentice–Hall, Englewood Cliffs, New Jersey 1975.

(List continued on next page.)

*Primary Examiner*—Paul P. Gordon
*Assistant Examiner*—McDieunel Marc
*Attorney, Agent, or Firm*—Gregory M. Howison

[57] ABSTRACT

A method for modeling a steady-state network in the absence of steady-state historical data. A steady-state neural network can be tied by impressing the dynamics of the system onto the input data during the training operation by first determining the dynamics in a local region of the input space, this providing a set of dynamic training data. This dynamic training data is then utilized to train a dynamic model, gain thereof then set equal to unity such that the dynamic model is now valid over the entire input space. This is a linear model, and the historical data over the entire input space is then processed through this model prior to input to the neural network during training thereof to remove the dynamic component from the data, leaving the steady-state component for the purpose of training. This provides a valid model in the presence of historical data that has a large content of dynamic behavior. A single dynamic model is required for each output variable in a multi-input multi-output steady-state model such that for each output there is a separate dynamic model required for pre-filtering. They are combined in a single network made up of multiple individual steady-state models for each output. The dynamic model can be identified utilizing a weighting factor for the gain to force the dynamic gain of the dynamic model to the steady-state gain by weighting the difference thereof during optimization of the dynamic model. The steady-state model is optimized utilizing gain constraints during the optimization procedure such that the gain of the network is prevented from exceeding the gain constraints.

36 Claims, 16 Drawing Sheets

OTHER PUBLICATIONS

"Time Series Analysis", Box, G.E.B. and G.M. Jenkins, Holden–Day, San Francisco, 1976.

"Digital Parameter—Adaptive Control of Processe with Unknown Dead Time", Kurz, H. and W. Goedecke, Automatica, vol. 17, No. 1, 1981, pp. 245–252.

European Patent Office Patent Abstract, Application No. 01138748, Sekine, et al., filed May 31, 1989.

"Process Dynamics and Control", D.E. Seborg, T.F. Edgar and D.A. Mellichamp, Wiley and Sons, New York, NY 1989.

"Model Predictive Control Using Neural Networks", T.J. Graettinger, N.V. Bhat, K. Heckendorn, J.S. Buck, AIChE, pp. 1–11, Apr. 1994.

"Gain Scheduled Model Predictive Control of A Crude Oil Distillation Unit", Muske, Kenneth R., Logue, Dan A., Keaton, Michael M., AIChE, Aug. 15, 1991, pp. 1–12.

"Integration of Multilayer Perceptron Networks and Linear Dynamic Models: A Hammerstein Modeling Approach", Su, H.–T. and T.J. McAvoy, I&EC Fundamentals, Jul. 1992.

"Model Predictive Control: Theory and Practice—A Survey", C.E. Garcia, D.M. Prett and M. Morari, Automatica, 25:335–348, 1989.

"Adaptive Control with NeuCOP, the Neural Control and Optimixation Package", T. Graettinger, N.V. Bhat, J.S. Buck, IEEE International Conference, 1994.

"Systematic Process Modeling and Identification for Prediction, Control and Optimization", G.D. Martin, Pavilion Invention Disclosure Description, Jun. 9, 1995.

PCT Search Report for PCT/US97/–8473, dated Sep. 3, 1997.

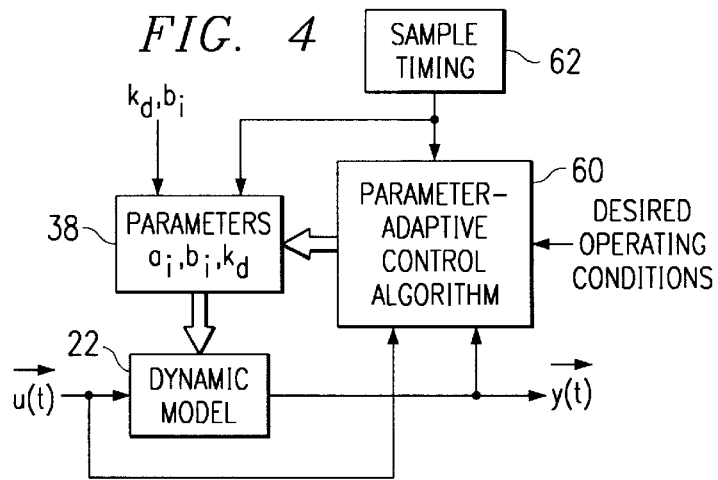
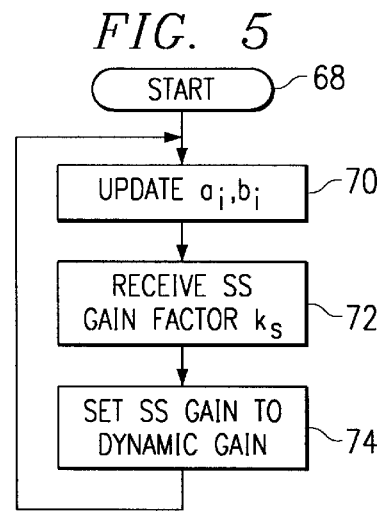
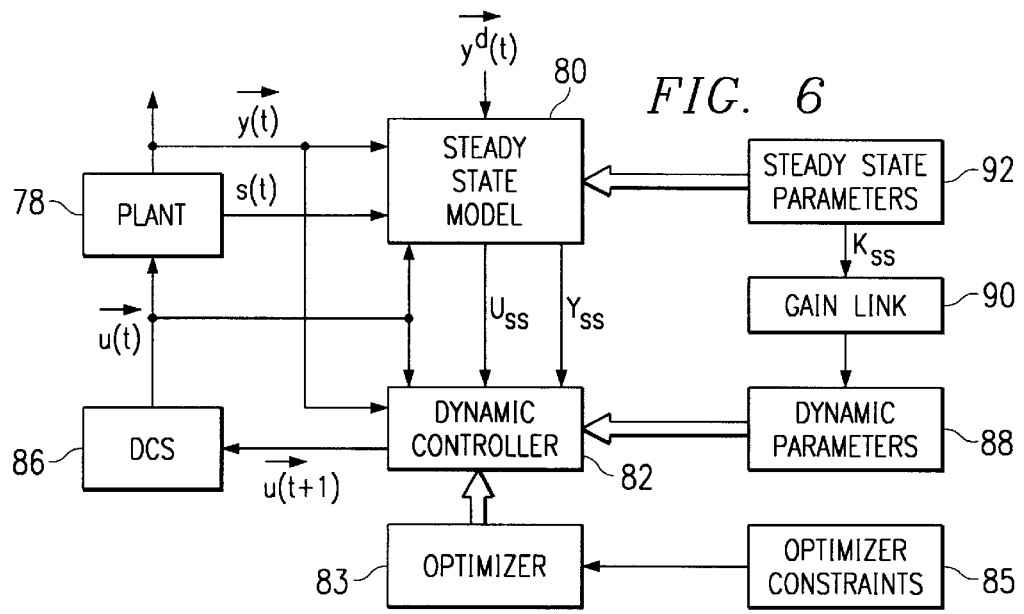
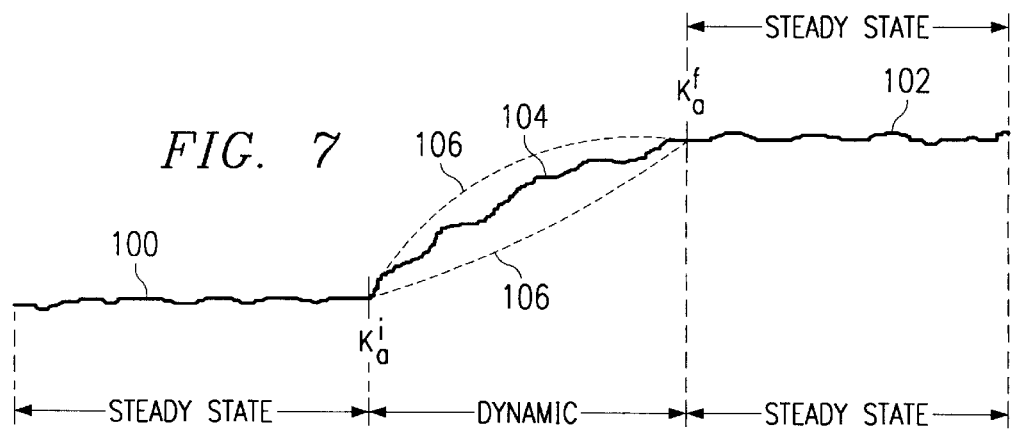

METHOD FOR STEADY-STATE IDENTIFICATION BASED UPON IDENTIFIED DYNAMICS

CROSS-REFERENCE TO RELATED APPLICATIONS

This application is a Continuation-in-Part Application of U.S. patent application Ser. No. 08/643,464, filed May 6, 1996, and entitled "Method and Apparatus for Modeling Dynamic and Steady-State Processors for Prediction, Control, and Optimization." Now becomes U.S. Pat. No. 5,933,345 as of Aug. 3, 1999.

TECHNICAL FIELD OF THE INVENTION

The present invention pertains in general to identification of steady-state models and, more particularly, to a method for identifying a steady-state model in the presence of data having dynamic information contained therein.

BACKGROUND OF THE INVENTION

Process models that are utilized for prediction, control and optimization can be divided into two general categories, steady-state models and dynamic models. In each case the model is a mathematical construct that characterizes the process, and process measurements are utilized to parameterize or fit the model so that it replicates the behavior of the process. The mathematical model can then be implemented in a simulator for prediction or inverted by an optimization algorithm for control or optimization.

Steady-state or static models are utilized in modern process control systems that usually store a great deal of data, this data typically containing steady-state information at many different operating conditions. The steady-state information is utilized to train a non-linear model wherein the process input variables are represented by the vector U that is processed through the model to output the dependent variable Y. The non-linear model is a steady-state phenomenological or empirical model developed utilizing several ordered pairs $(U_i, Y_i)$ of data from different measured steady states. If a model is represented as:

$$Y = P(U, Y) \quad (1)$$

where P is some parameterization, then the steady-state modeling procedure can be presented as:

$$(\overline{U}, \overline{Y}) \rightarrow P \quad (2)$$

where U and Y are vectors containing the $U_i$, $Y_i$ ordered pair elements. Given the model P, then the steady-state process gain can be calculated as:

$$K = \frac{\Delta P(U, Y)}{\Delta U} \quad (3)$$

The steady-state model therefore represents the process measurements that are taken when the system is in a "static" mode. These measurements do not account for the perturbations that exist when changing from one steady-state condition to another steady-state condition. This is referred to as the dynamic part of a model.

A dynamic model is typically a linear model and is obtained from process measurements which are not steady-state measurements; rather, these are the data obtained when the process is moved from one steady-state condition to another steady-state condition. This procedure is where a process input or manipulated variable u(t) is input to a process with a process output or controlled variable y(t) being output and measured. Again, ordered pairs of measured data (u(I), y(I)) can be utilized to parameterize a phenomenological or empirical model, this time the data coming from non-steady-state operation. The dynamic model is represented as:

$$y(t) = p(u(t), y(t)) \quad (4)$$

where p is some parameterization. Then the dynamic modeling procedure can be represented as:

$$(\overline{u}, \overline{y}) \rightarrow p \quad (5)$$

Where u and y are vectors containing the (u(I),y(I)) ordered pair elements. Given the model p, then the steady-state gain of a dynamic model can be calculated as:

$$k = \frac{\Delta p(u, y)}{\Delta u} \quad (6)$$

Unfortunately, almost always the dynamic gain k does not equal the steady-state gain K, since the steady-state gain is modeled on a much larger set of data, whereas the dynamic gain is defined around a set of operating conditions wherein an existing set of operating conditions are mildly perturbed. This results in a shortage of sufficient non-linear information in the dynamic data set in which non-linear information is contained within the static model. Therefore, the gain of the system may not be adequately modeled for an existing set of steady-state operating conditions. Thus, when considering two independent models, one for the steady-state model and one for the dynamic model, there is a mis-match between the gains of the two models when used for prediction, control and optimization. The reason for this mis-match are that the steady-state model is non-linear and the dynamic model is linear, such that the gain of the steady-state model changes depending on the process operating point, with the gain of the linear model being fixed. Also, the data utilized to parameterize the dynamic model do not represent the complete operating range of the process, i.e., the dynamic data is only valid in a narrow region. Further, the dynamic model represents the acceleration properties of the process (like inertia) whereas the steady-state model represents the tradeoffs that determine the process final resting value (similar to the tradeoff between gravity and drag that determines terminal velocity in free fall).

One technique for combining non-linear static models and linear dynamic models is referred to as the Hammerstein model. The Hammerstein model is basically an input-output representation that is decomposed into two coupled parts. This utilizes a set of intermediate variables that are determined by the static models which are then utilized to construct the dynamic model. These two models are not independent and are relatively complex to create.

Plants have been modeled utilizing the various non-linear networks. One type of network that has been utilized in the past is a neural network. These neural networks typically comprise a plurality of inputs which are mapped through a stored representation of the plant to yield on the output thereof predicted outputs. These predicted outputs can be any output of the plant. The stored representation within the plant is typically determined through a training operation.

During the training of a neural network, the neural network is presented with a set of training data. This training data typically comprises historical data taken from a plant. This historical data is comprised of actual input data and actual output data, which output data is referred to as the target data. During training, the actual input data is presented to the network with the target data also presented to the network, and then the network trained to reduce the error between the predicted output from the network and the actual target data. One very widely utilized technique for training a neural network is a backpropagation training algorithm. However, there are other types of algorithms that can be utilized to set the "weights" in the network.

When a large amount of steady-state data is available to a network, the stored representation can be accurately modeled. However, some plants have a large amount of dynamic information associated therewith. This dynamic information reflects the fact that the inputs to the plant undergo a change which results in a corresponding change in the output. If a user desired to predict the final steady-state value of the plant, plant dynamics may not be important and this data could be ignored. However, there are situations wherein the dynamics of the plant are important during the prediction. It may be desirable to predict the path that an output will take from a beginning point to an end point. For example, if the input were to change in a step function from one value to another, a steady-state model that was accurately trained would predict the final steady-state value with some accuracy. However, the path between the starting point and the end point would not be predicted, as this would be subject to the dynamics of the plant. Further, in some control applications, it may be desirable to actually control the plant such that the plant dynamics were "constrained," this requiring some knowledge of the dynamic operation of the plant.

In some applications, the actual historical data that is available as the training set has associated therewith a considerable amount of dynamic information. If the training data set had a large amount of steady-state information, an accurate model could easily be obtained for a steady-state model. However, if the historical data had a large amount of dynamic information associated therewith, i.e., the plant were not allowed to come to rest for a given data point, then there would be an error associated with the training operation that would be a result of this dynamic component in the training data. This is typically the case for small data sets. This dynamic component must therefore be dealt with for small training data sets when attempting to train a steady-state model.

SUMMARY OF THE INVENTION

The present invention disclosed and claimed herein comprises a method for training a steady-state, non-linear model of a plant. The method includes the step of first generating an input set of training data that represents the historical operation of the plant over the input space, having input data and output data associated therewith. A linear dynamic model of the plant representing the dynamics of the plant is then identified. The historical data is then pre-filtered utilizing this dynamic model, which pre-filtering is operable to impress the dynamics of the plant as defined by the linear dynamic model onto the input data. A non-linear model of the plant is then trained with the pre-filtered data to provide a stored representation of the steady-state operation of the non-linear model.

In another aspect of the present invention, the step of training the non-linear network model comprises training a non-linear neural network having an input layer, an output layer, and a hidden layer for storing a learned representation of the plant and for mapping the input layer to the output layer through the hidden layer and the stored learned representation of the plant. The learned representation of the plant comprises the steady-state operation of the plant.

In yet another aspect of the present invention, the step of identifying the linear dynamic model includes first generating a set of dynamic data defining the dynamics of the plant. A linear dynamic model is then defined and the dynamic data utilized to identify the parameters of this defined linear dynamic model.

In a further aspect of the present invention, the step of generating the set of dynamic data comprises performing a step test on the plant by varying select ones of the inputs from a first steady-state value to a second value and then returning to the initial steady-state value. Additionally, the gain of the dynamic model is normalized to one by adjusting the parameters thereof after the step of identification.

In yet a further aspect of the present invention, a method is provided for training a steady-state model, the model having an input and an output and a mapping layer for mapping the input to the output through a stored representation of the plant. A training data set is provided that has a set of input data u(t) and target output data y(t) representative of the operation of the plant. The model is trained with a predetermined training algorithm, with the training algorithm constrained to maintain the sensitivity of the output with respect to the input substantially within user-defined bounds.

In yet a further aspect of the present invention, a method is provided for developing a linear dynamic model of the plant. This comprises the steps of first creating a linear model for predicting a dynamic response y(t) of an input u(t) and having a dynamic gain $k_d$, which linear model can define the dynamic response of the plant. A training data set of dynamic input data $u_d(t)$ is generated along with output dynamic data $y_d(t)$. A user-defined sensitivity value is provided that represents the sensitivity of the output of the plant with respect to the input of the plant at steady state. A linear model is then trained on the training data set with a predetermined training algorithm, with the training algorithm constrained with a scaled level of the difference between the dynamic gain and the user-defined sensitivity such that an error generated with the training algorithm will increase as the difference between the dynamic gain and the user-defined sensitivity increases.

In an even further aspect of the present invention, a method for determining the dead-time d between an input variable u(t) of the plant and an output variable y(t) of the plant is provided. A historical data set of input variables u(t) for a given output variable y(t) are provided. A minimum dead-time $d_{j,min}$ and a maximum dead-time $d_{j,max}$ are defined. The value of $d_j$ is varied from $d_{j,min}$ to $d_{j,max}$. For each input variable $u_i(t-d_j)$. The strength of the statistical relationship between the input variable $u_i(t)$ and the output variable y(t) for each value of j as $d_j$ varies from $d_{j,min}$ to $d_{j,max}$ is determined. The value of j for $d_j$ is selected as the $d_j$ value having the strongest statistical relationship for the given input variable $u_i(t-d_j)$.

BRIEF DESCRIPTION OF THE DRAWINGS

For a more complete understanding of the present invention and the advantages thereof, reference is now made to the following description taken in conjunction with the accompanying Drawings in which:

FIG. 4 illustrates a detailed block diagram of a dynamic model;

FIG. 5 illustrates a block diagram of the operation of the model of FIG. 4;

FIG. 6 illustrates an example of the modeling technique of the embodiment of FIG. 2 utilized in a control environment;

FIG. 7 illustrates a diagrammatic view of a change between two steady-state values;

FIGS. 41–45 illustrate screen views for changing the number of variables that can be displayed from a given set.

DETAILED DESCRIPTION OF THE INVENTION

Figure 1:
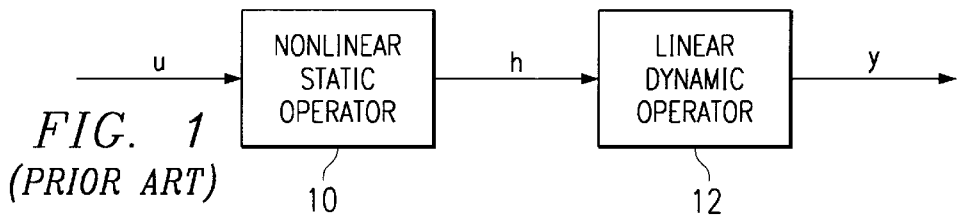
FIG. 1 illustrates a prior art Hammerstein model.

Referring now to FIG. 1, there is illustrated a diagrammatic view of a Hammerstein model of the prior art. This is comprised of a non-linear static operator model 10 and a linear dynamic model 12, both disposed in a series configuration. The operation of this model is described in H. T. Su, and T. J. McAvoy, "Integration of Multilayer Perceptron Networks and Linear Dynamic Models: A Hammerstein Modeling Approach" to appear in *I & EC Fundamentals*, paper dated Jul. 7, 1992, which reference is incorporated herein by reference. Hammerstein models in general have been utilized in modeling non-linear systems for some time. The structure of the Hammerstein model illustrated in FIG. 1 utilizes the non-linear static operator model 10 to transform the input U into intermediate variables H. The non-linear operator is usually represented by a finite polynomial expansion. However, this could utilize a neural network or any type of compatible modeling system. The linear dynamic operator model 12 could utilize a discreet dynamic transfer function representing the dynamic relationship between the intermediate variable H and the output Y. For multiple input systems, the non-linear operator could utilize a multilayer neural network, whereas the linear operator could utilize a two layer neural network. A neural network for the static operator is generally well known and described in U.S. Pat. No. 5,353,207, issued Oct. 4, 1994, and assigned to the present assignee, which is incorporated herein by reference. These type of networks are typically referred to as a multilayer feed-forward network which utilizes training in the form of back-propagation. This is typically performed on a large set of training data. Once trained, the network has weights associated therewith, which are stored in a separate database.

Once the steady-state model is obtained, one can then choose the output vector from the hidden layer in the neural network as the intermediate variable for the Hammerstein model. In order to determine the input for the linear dynamic operator, u(t), it is necessary to scale the output vector h(d) from the non-linear static operator model 10 for the mapping of the intermediate variable h(t) to the output variable of the dynamic model y(t), which is determined by the linear dynamic model.

During the development of a linear dynamic model to represent the linear dynamic operator, in the Hammerstein model, it is important that the steady-state non-linearity remain the same. To achieve this goal, one must train the dynamic model subject to a constraint so that the non-linearity learned by the steady-state model remains unchanged after the training. This results in a dependency of the two models on each other.

Figure 2:
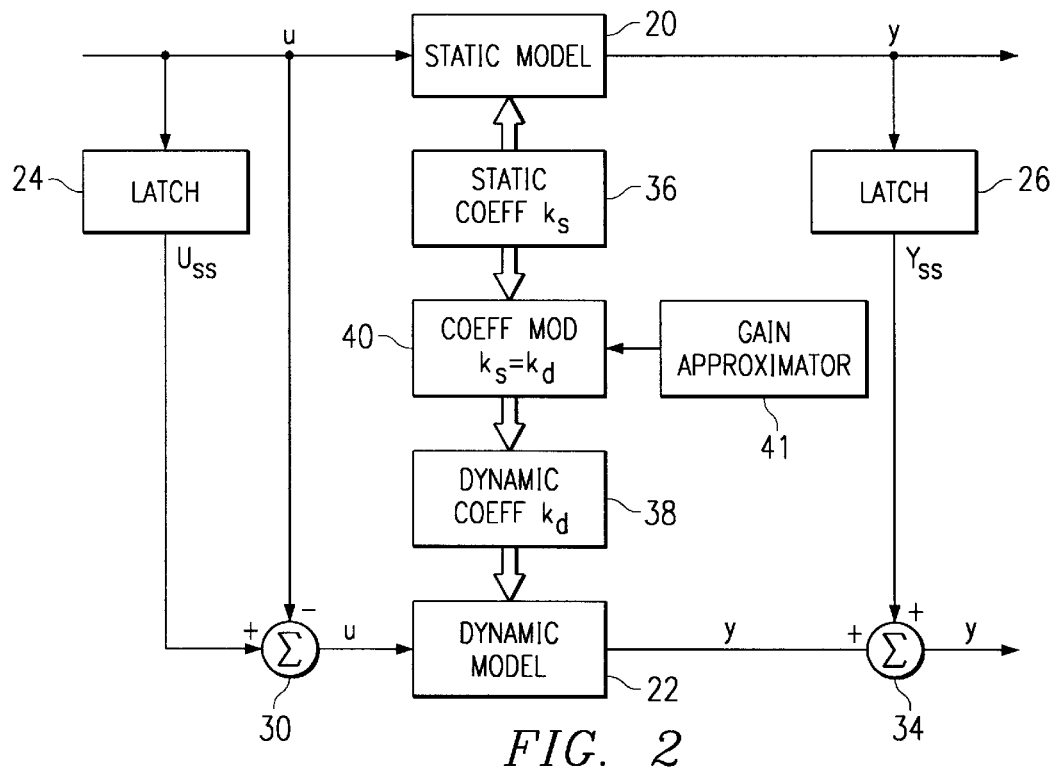
FIG. 2 illustrates a block diagram of a modeling technique utilizing steady-state gain to define the gain of the dynamic model.

Referring now to FIG. 2, there is illustrated a block diagram of the modeling method in one embodiment, which is referred to as a systematic modeling technique. The general concept of the systematic modeling technique in the present invention results from the observation that, while process gains (steady-state behavior) vary with U's and Y's, (i.e., the gains are non-linear), the process dynamics seemingly vary with time only, (i.e., they can be modeled as locally linear, but time-varied). By utilizing non-linear models for the steady-state behavior and linear models for the dynamic behavior, several practical advantages result. They are as follows:

1. Completely rigorous models can be utilized for the steady-state part. This provides a credible basis for economic optimization.
2. The linear models for the dynamic part can be updated on-line, i.e., the dynamic parameters that are known to be time-varying can be adapted slowly.
3. The gains of the dynamic models and the gains of the steady-state models can be forced to be consistent (k=K).

With further reference to FIG. 2, there are provided a static or steady-state model 20 and a dynamic model 22. The static model 20, as described above, is a rigorous model that is trained on a large set of steady-state data. The static model 20 will receive a process input U and provide a predicted output Y. These are essentially steady-state values. The steady-state values at a given time are latched in various latches, an input latch 24 and an output latch 26. The latch 24 contains the steady-state value of the input $U_{ss}$, and the latch 26 contains the steady-state output value $Y_{ss}$. The dynamic model 22 is utilized to predict the behavior of the plant when a change is made from a steady-state value of $Y_{ss}$ to a new value Y. The dynamic model 22 receives on the input the dynamic input value u and outputs a predicted dynamic value y. The value u is comprised of the difference between the new value U and the steady-state value in the latch 24, $U_{ss}$. This is derived from a subtraction circuit 30 which receives on the positive input thereof the output of the latch 24 and on the negative input thereof the new value of U. This therefore represents the delta change from the steady-state. Similarly, on the output the predicted overall dynamic value will be the sum of the output value of the dynamic model, y, and the steady-state output value stored in the latch 26, $Y_{ss}$. These two values are summed with a summing block 34 to provide a predicted output Y. The difference between the value output by the summing junction 34 and the predicted value output by the static model 20 is that the predicted value output by the summing junction 20 accounts for the dynamic operation of the system during a change. For example, to process the input values that are in the input vector U by the static model 20, the rigorous model, can take significantly more time than running a relatively simple dynamic model. The method utilized in the present invention is to force the gain of the dynamic model 22 $k_d$ to equal the gain $K_{ss}$ of the static model 20.

In the static model 20, there is provided a storage block 36 which contains the static coefficients associated with the static model 20 and also the associated gain value $K_{ss}$. Similarly, the dynamic model 22 has a storage area 38 that is operable to contain the dynamic coefficients and the gain value $k_d$. One of the important aspects of the present invention is a link block 40 that is operable to modify the coefficients in the storage area 38 to force the value of $k_d$ to be equal to the value of $K_{ss}$. Additionally, there is an approximation block 41 that allows approximation of the dynamic gain $k_d$ between the modification updates.

Systematic Model

The linear dynamic model 22 can generally be represented by the following equations:

$$\delta y(t) = \sum_{i=1}^{n} b_i \delta u(t - d - i) - \sum_{i=1}^{n} a_i \delta y(t - i) \quad (7)$$

where:

$$\delta y(t) = y(t) - Y_{ss} \quad (8)$$

$$\delta u(t) = u(t) - u_{ss} \quad (9)$$

and t is time, $a_i$ and $b_i$ are real numbers, d is a time delay, u(t) is an input and y(t) an output. The gain is represented by:

$$\frac{y(B)}{u(B)} = k = \frac{\left(\sum_{i=1}^{n} b_i B^{i-1}\right) B^d}{1 + \sum_{i=1}^{n} a_i B^{i-1}} \quad (10)$$

where B is the backward shift operator B(x(t))=x(t−1), t=time, the $a_i$ and $b_i$ are real numbers, I is the number of discreet time intervals in the dead-time of the process, and n is the order of the model. This is a general representation of a linear dynamic model, as contained in George E. P. Box and G. M. Jenkins, "TIME SERIES ANALYSIS forecasting and control", Holden-Day, San Francisco, 1976, Section 10.2, Page 345. This reference is incorporated herein by reference.

The gain of this model can be calculated by setting the value of B equal to a value of "1". The gain will then be defined by the following equation:

$$\left[\frac{y(B)}{u(B)}\right]_{B=1} = k_d = \frac{\sum_{i=1}^{n} b_i}{1 + \sum_{i=1}^{n} a_i} \quad (11)$$

The $a_i$ contain the dynamic signature of the process, its unforced, natural response characteristic. They are independent of the process gain. The $b_i$ contain part of the dynamic signature of the process; however, they alone contain the result of the forced response. The $b_i$ determine the gain k of the dynamic model. See: J. L. Shearer, A. T. Murphy, and H. H. Richardson, "Introduction to System Dynamics", Addison-Wesley, Reading, Mass., 1967, Chapter 12. This reference is incorporated herein by reference.

Since the gain $K_{ss}$ of the steady-state model is known, the gain $k_d$ of the dynamic model can be forced to match the gain of the steady-state model by scaling the $b_i$ parameters.

The values of the static and dynamic gains are set equal with the value of $b_i$ scaled by the ratio of the two gains:

$$(b_i)_{scaled} = (b_i)_{old}\left(\frac{K_{ss}}{k_d}\right) \quad (12)$$

$$(b_i)_{scaled} = \frac{(b_i)_{old} K_{ss}\left(1 + \sum_{i=1}^{n} a_i\right)}{\sum_{i=1}^{n} b_i} \quad (13)$$

This makes the dynamic model consistent with its steady-state counterpart. Therefore, each time the steady-state value changes, this corresponds to a gain $K_{ss}$ of the steady-state model. This value can then be utilized to update the gain $k_d$ of the dynamic model and, therefore, compensate for the errors associated with the dynamic model wherein the value of $k_d$ is determined based on perturbations in the plant on a given set of operating conditions. Since all operating conditions are not modeled, the step of varying the gain will account for changes in the steady-state starting points.

Figure 3A:
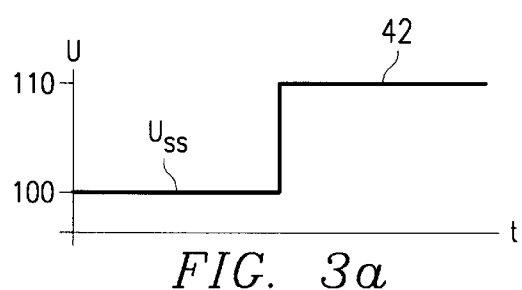
FIGS. 3a–3d illustrate timing diagrams for the various outputs of the system of FIG. 2.
Figure 3B:
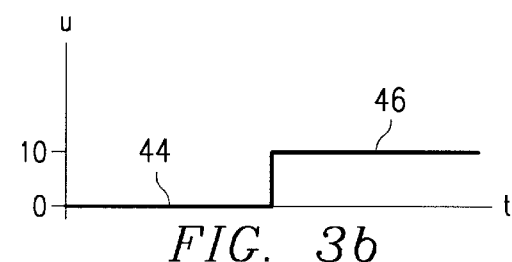
Figure 3C:
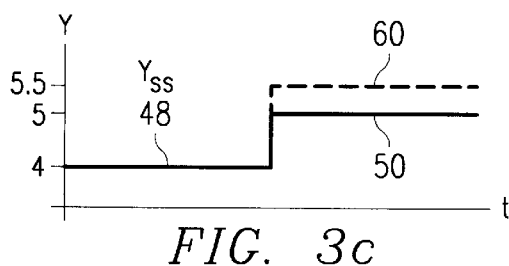
Figure 3D:
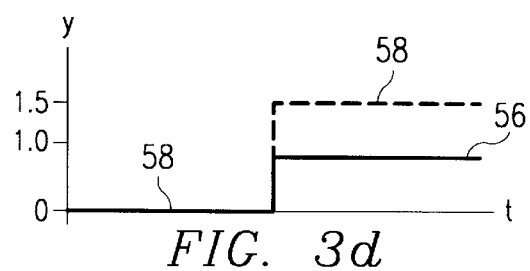

Referring now to FIGS. 3a–3d, there are illustrated plots of the system operating in response to a step function wherein the input value U changes from a value of 100 to a value of 110. In FIG. 3a, the value of 100 is referred to as the previous steady-state value $U_{ss}$. In FIG. 3b, the value of u varies from a value of 0 to a value of 10, this representing the delta between the steady-state value of $U_{ss}$ to the level of 110, represented by reference numeral 42 in FIG. 3a. Therefore, in FIG. 3b the value of u will go from 0 at a level 44, to a value of 10 at a level 46. In FIG. 3c, the output Y is represented as having a steady-state value $Y_{ss}$ of 4 at a level 48. When the input value U rises to the level 42 with a value of 110, the output value will rise. This is a predicted value. The predicted value which is the proper output value is represented by a level 50, which level 50 is at a value of 5. Since the steady-state value is at a value of 4, this means that the dynamic system must predict a difference of a value of 1. This is represented by FIG. 3d wherein the dynamic output value y varies from a level 54 having a value of 0 to a level 56 having a value of 1.0. However, without the gain scaling, the dynamic model could, by way of example, predict a value for y of 1.5, represented by dashed level 58, if the steady-state values were outside of the range in which the dynamic model was trained. This would correspond to a value of 5.5 at a level 60 in the plot of FIG. 3c. It can be seen that the dynamic model merely predicts the behavior of the plant from a starting point to a stopping point, not taking into consideration the steady-state values. It assumes that the steady-state values are those that it was trained upon. If the gain $k_d$ were not scaled, then the dynamic model would assume that the steady-state values at the starting point were the same that it was trained upon. However, the gain scaling link between the steady-state model and the dynamic model allow the gain to be scaled and the parameter $b_i$ to be scaled such that the dynamic operation is scaled and a more accurate prediction is made which accounts for the dynamic properties of the system.

Referring now to FIG. 4, there is illustrated a block diagram of a method for determining the parameters $a_i$, $b_i$. This is usually achieved through the use of an identification algorithm, which is conventional. This utilizes the (u(t),y(t)) pairs to obtain the $a_i$ and $b_i$ parameters. In the preferred embodiment, a recursive identification method is utilized where the $a_i$ and $b_i$ parameters are updated with each new $(u_i(t), y_i(t))$ pair. See: T. Eykhoff, "System Identification", John Wiley & Sons, New York, 1974, Pages 38 and 39, et. seq., and H. Kurz and W. Godecke, "Digital Parameter-Adaptive Control Processes with Unknown Dead Time", Automatica, Vol. 17, No. 1, 1981, pp. 245–252, which references are incorporated herein by reference.

In the technique of FIG. 4, the dynamic model 22 has the output thereof input to a parameter-adaptive control algorithm block 60 which adjusts the parameters in the coefficient storage block 38, which also receives the scaled values of k, $b_i$. This is a system that is updated on a periodic basis, as defined by timing block 62. The control algorithm 60 utilizes both the input u and the output y for the purpose of determining and updating the parameters in the storage area 38.

Referring now to FIG. 5, there is illustrated a block diagram of the preferred method. The program is initiated in a block 68 and then proceeds to a function block 70 to update the parameters $a_i$, $b_i$ utilizing the (u(I),y(I)) pairs. Once these are updated, the program flows to a function block 72 wherein the steady-state gain factor K is received, and then to a function block 74 to set the dynamic gain to the steady-state gain, i.e., provide the scaling function described hereinabove. This is performed after the update. This procedure can be used for on-line identification, non-linear dynamic model prediction and adaptive control.

Referring now to FIG. 6, there is illustrated a block diagram of one application of the present invention utilizing a control environment. A plant 78 is provided which receives input values u(t) and outputs an output vector y(t). The plant 78 also has measurable state variables s(t). A predictive model 80 is provided which receives the input values u(t) and the state variables s(t) in addition to the output value y(t). The steady-state model 80 is operable to output a predicted value of both y(t) and also of a future input value u(t+1). This constitutes a steady-state portion of the system. The predicted steady-state input value is $U_{ss}$ with the predicted steady-state output value being $Y_{ss}$. In a conventional control scenario, the steady-state model 80 would receive as an external input a desired value of the output $y^d(t)$ which is the desired value that the overall control system seeks to achieve. This is achieved by controlling a distributed control system (DCS) 86 to produce a desired input to the plant. This is referred to as u(t+1), a future value. Without considering the dynamic response, the predictive model 80, a steady-state model, will provide the steady-state values. However, when a change is desired, this change will effectively be viewed as a "step response".

To facilitate the dynamic control aspect, a dynamic controller 82 is provided which is operable to receive the input u(t), the output value y(t) and also the steady-state values $U_{ss}$ and $Y_{ss}$ and generate the output u(t+1). The dynamic controller effectively generates the dynamic response between the changes, i.e., when the steady-state value changes from an initial steady-state value $U_{ss}^i$, $Y_{ss}^i$ to a final steady-state value $U_{ss}^f$, $Y_{ss}^f$.

During the operation of the system, the dynamic controller 82 is operable in accordance with the embodiment of FIG. 2 to update the dynamic parameters of the dynamic controller 82 in a block 88 with a gain link block 90, which utilizes the value $K_{ss}$ from a steady-state parameter block in order to scale the parameters utilized by the dynamic controller 82, again in accordance with the above described method. In this manner, the control function can be realized. In addition, the dynamic controller 82 has the operation thereof optimized such that the path traveled between the initial and final steady-state values is achieved with the use of the optimizer 83 in view of optimizer constraints in a block 85. In general, the predicted model (steady-state model) 80 provides a control network function that is operable to predict the future input values. Without the dynamic controller 82, this is a conventional control network which is generally described in U.S. Pat. No. 5,353, 207, issued Oct. 4, 1994, to the present assignee, which patent is incorporated herein by reference.

Approximate Systematic Modeling

For the modeling techniques described thus far, consistency between the steady-state and dynamic models is maintained by rescaling the $b_i$ parameters at each time step utilizing equation 13. If the systematic model is to be utilized in a Model Predictive Control (MPC) algorithm, maintaining consistency may be computationally expensive. These types of algorithms are described in C. E. Garcia, D. M. Prett and M. Morari. Model predictive control: theory and practice—a survey, Automatica, 25:335–348, 1989; D. E. Seborg, T. F. Edgar, and D. A. Mellichamp. Process Dynamics and Control, John Wiley and Sons, New York, N.Y., 1989. These references are incorporated herein by reference. For example, if the dynamic gain $k_d$ is computed from a neural network steady-state model, it would be necessary to execute the neural network module each time the model was iterated in the MPC algorithm. Due to the potentially large number of model iterations for certain MPC problems, it could be computationally expensive to maintain a consistent model. In this case, it would be better to use an approximate model which does not rely on enforcing consistencies at each iteration of the model.

Referring now to FIG. 7, there is illustrated a diagram for a change between steady-state values. As illustrated, the steady-state model will make a change from a steady-state value at a line 100 to a steady-state value at a line 102. A transition between the two steady-state values can result in unknown settings. The only way to insure that the settings for the dynamic model between the two steady-state values, an initial steady-state value $K_{ss}^i$ and a final steady-state gain $K_{ss}^f$, would be to utilize a step operation, wherein the dynamic gain $k_d$ was adjusted at multiple positions during the change. However, this may be computationally expensive. As will be described hereinbelow, an approximation algorithm is utilized for approximating the dynamic behavior between the two steady-state values utilizing a quadratic relationship. This is defined as a behavior line 104, which is disposed between an envelope 106, which behavior line 104 will be described hereinbelow.

Figure 8:
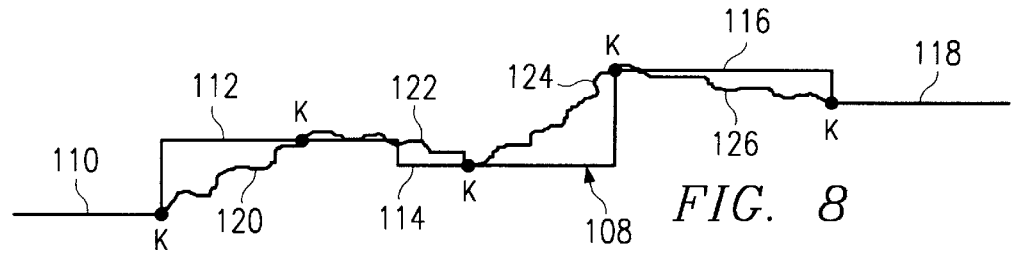
FIG. 8 illustrates a diagrammatic view of the approximation algorithm for changes in the steady-state value.

Referring now to FIG. 8, there is illustrated a diagrammatic view of the system undergoing numerous changes in steady-state value as represented by a stepped line 108. The stepped line 108 is seen to vary from a first steady-state value at a level 110 to a value at a level 112 and then down to a value at a level 114, up to a value at a level 116 and then down to a final value at a level 118. Each of these transitions can result in unknown states. With the approximation algorithm that will be described hereinbelow, it can be seen that, when a transition is made from level 110 to level 112, an approximation curve for the dynamic behavior 120 is provided. When making a transition from level 114 to level 116, an approximation gain curve 124 is provided to approximate the steady-state gains between the two levels 114 and 116. For making the transition from level 116 to level 118, an approximation gain curve 126 for the steady-state gain is provided. It can therefore be seen that the approximation curves 120–126 account for transitions between steady-state values that are determined by the network, it being noted that these are approximations which primarily maintain the steady-state gain within some type of error envelope, the envelope 106 in FIG. 7.

The approximation is provided by the block 41 noted in FIG. 2 and can be designed upon a number of criteria, depending upon the problem that it will be utilized to solve. The system in the preferred embodiment, which is only one example, is designed to satisfy the following criteria:

1. Computational Complexity: The approximate systematic model will be used in a Model Predictive Control algorithm, therefore, it is required to have low computational complexity.

2. Localized Accuracy: The steady-state model is accurate in localized regions. These regions represent the steady-state operating regimes of the process. The steady-state model is significantly less accurate outside these localized regions.

3. Final Steady-State: Given a steady-state set point change, an optimization algorithm which uses the steady-state model will be used to compute the steady-state inputs required to achieve the set point. Because of item 2, it is assumed that the initial and final steady-states associated with a set-point change are located in regions accurately modeled by the steady-state model.

Given the noted criteria, an approximate systematic model can be constructed by enforcing consistency of the steady-state and dynamic model at the initial and final steady-state associated with a set point change and utilizing a linear approximation at points in between the two steady-states. This approximation guarantees that the model is accurate in regions where the steady-state model is well known and utilizes a linear approximation in regions where the steady-state model is known to be less accurate. In addition, the resulting model has low computational complexity. For purposes of this proof, Equation 13 is modified as follows:

$$b_{i,scaled} = \frac{b_i K_{ss}(u(t-d-1))\left(1 + \sum_{i=1}^{n} a_i\right)}{\sum_{i=1}^{n} b_i} \quad (14)$$

This new equation 14 utilizes $K_{ss}(u(t-d-1))$ instead of $K_{ss}(u(t))$ as the consistent gain, resulting in a systematic model which is delay invariant.

The approximate systematic model is based upon utilizing the gains associated with the initial and final steady-state values of a set-point change. The initial steady-state gain is denoted $K_{ss}^i$ while the initial steady-state input is given by $U_{ss}^i$. The final steady-state gain is $K_{ss}^f$ and the final input is $U_{ss}^f$. Given these values, a linear approximation to the gain is given by:

$$K_{ss}(u(t)) = K_{ss}^i + \frac{K_{ss}^f - K_{ss}^i}{U_{ss}^f - U_{ss}^i}(u(t) - U_{ss}^i). \quad (15)$$

Substituting this approximation into Equation 13 and replacing $u(t-d-1)-u^i$ by $\delta u(t-d-1)$ yields:

$$\tilde{b}_{j,scaled} = \quad (16)$$

$$\frac{b_f K_{ss}^i \left(1 + \sum_{i=1}^{n} a_i\right)}{\sum_{i=1}^{n} b_i} + \frac{1}{2} \frac{b_j \left(1 + \sum_{i=1}^{n} a_i\right)(K_{ss}^f - K_{ss}^i)}{\left(\sum_{i=1}^{n} b_i\right)(U_{ss}^f - U_{ss}^i)} \delta u(t - d - i).$$

To simplify the expression, define the variable $b_j$-Bar as:

$$\bar{b}_j = \frac{b_f K_{ss}^i \left(1 + \sum_{i=1}^{n} a_i\right)}{\sum_{i=1}^{n} b_i} \quad (17)$$

and $g_j$ as:

$$g_j = \frac{b_j \left(1 + \sum_{i=1}^{n} a_i\right)(K_{ss}^f - K_{ss}^i)}{\left(\sum_{i=1}^{n} b_i\right)(U_{ss}^f - U_{ss}^i)} \quad (18)$$

Equation 16 may be written as:

$$\tilde{b}_{j,scaled} = \bar{b} + g_j \delta u(t-d-i). \quad (19)$$

Finally, substituting the scaled b's back into the original difference Equation 7, the following expression for the approximate systematic model is obtained:

$$\delta y(t) = \sum_{i=1}^{n} \bar{b}_i \delta u(t - d - i) + \quad (20)$$

$$\sum_{i=1}^{n} g_i \delta u(t - d - i^2) \delta u(t - d - i) - \sum_{i=1}^{n} a_i \delta y(t - i)$$

The linear approximation for gain results in a quadratic difference equation for the output. Given Equation 20, the approximate systematic model is shown to be of low computational complexity. It may be used in a MPC algorithm to efficiently compute the required control moves for a transition from one steady-state to another after a set-point change. Note that this applies to the dynamic gain variations between steady-state transitions and not to the actual path values.

Control System Error Constraints

Figure 9:
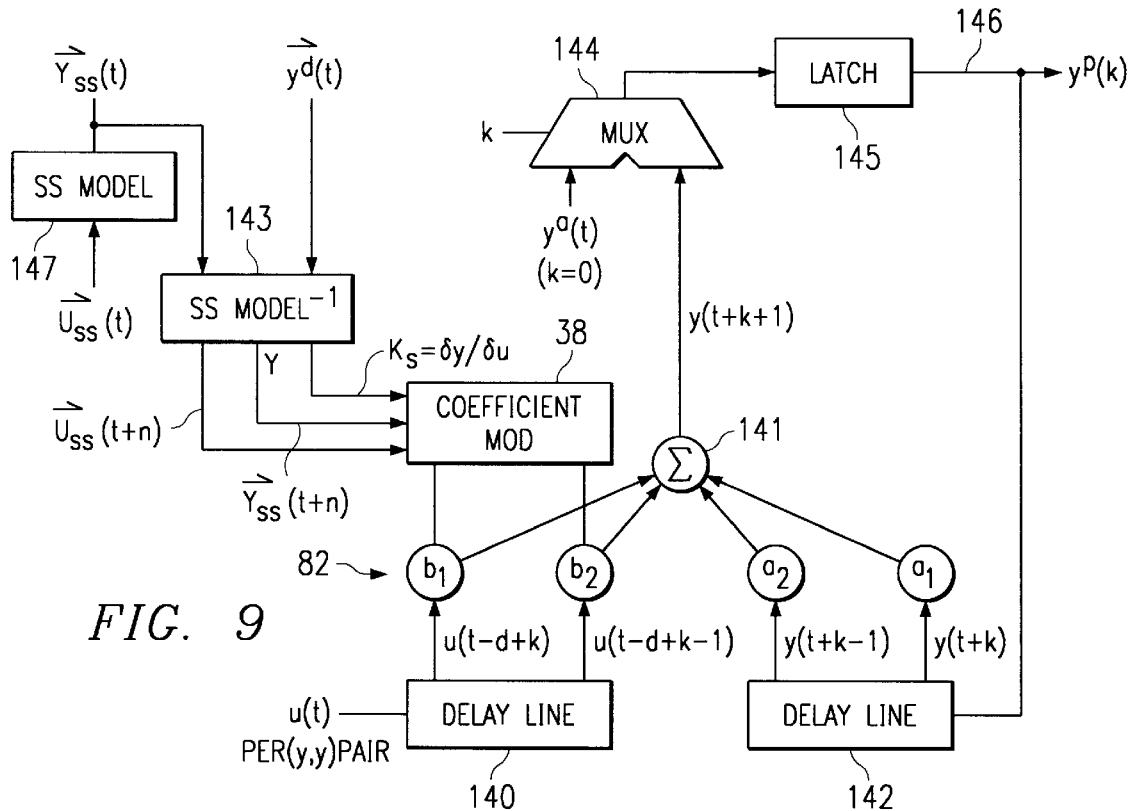
FIG. 9 illustrates a block diagram of the dynamic model.

Referring now to FIG. 9, there is illustrated a block diagram of the prediction engine for the dynamic controller 82 of FIG. 6. The prediction engine is operable to essentially predict a value of y(t) as the predicted future value y(t+1). Since the prediction engine must determine what the value of the output y(t) is at each future value between two steady-state values, it is necessary to perform these in a "step" manner. Therefore, there will be k steps from a value of zero to a value of N, which value at k=N is the value at the "horizon", the desired value. This, as will be described hereinbelow, is an iterative process, it being noted that the terminology for "(t+1)" refers to an incremental step, with an incremental step for the dynamic controller being smaller than an incremented step for the steady-state model. For the steady-state model, "y(t+N)" for the dynamic model will be, "y(t+1)" for the steady state The value y(t+1) is defined as follows:

$$y(t+1) = a_1 y(t) + a_2 y(t-1) + b_1 u(t-d-1) + b_2 u(t-d-2) \quad (21)$$

With further reference to FIG. 9, the input values u(t) for each (u,y) pair are input to a delay line 140. The output of the delay line provides the input value u(t) delayed by a delay value "d". There are provided only two operations for multiplication with the coefficients $b_1$ and $b_2$, such that only two values u(t) and u(t-1) are required. These are both delayed and then multiplied by the coefficients $b_1$ and $b_2$ and then input to a summing block 141. Similarly, the output value $y^p(t)$ is input to a delay line 142, there being two values required for multiplication with the coefficients $a_1$ and $a_2$. The output of this multiplication is then input to the summing block 141. The input to the delay line 142 is either the actual input value $y^a(t)$ or the iterated output value of the summation block 141, which is the previous value computed by the dynamic controller 82. Therefore, the summing block 141 will output the predicted value y(t+1) which will then be input to a multiplexor 144. The multiplexor 144 is operable to select the actual output $y^2(t)$ on the first operation and, thereafter, select the output of the summing block 141. Therefore, for a step value of k=0 the value $y^a(t)$ will be selected by the multiplexor 144 and will be latched in a latch 145. The latch 145 will provide the predicted value $y^p(t+k)$ on an output 146. This is the predicted value of y(t) for a given k that is input back to the input of delay line 142 for multiplication with the coefficients $a_1$ and $a_2$. This is iterated for each value of k from k=0 to k=N.

The $a_1$ and $a_2$ values are fixed, as described above, with the $b_1$ and $b_2$ values scaled. This scaling operation is performed by the coefficient modification block 38. However, this only defines the beginning steady-state value and the final steady-state value, with the dynamic controller and the optimization routines described in the present application defining how the dynamic controller operates between the steady-state values and also what the gain of the dynamic controller is. The gain specifically is what determines the modification operation performed by the coefficient modification block 38.

In FIG. 9, the coefficients in the coefficient modification block 38 are modified as described hereinabove with the information that is derived from the steady-state model. The steady-state model is operated in a control application, and is comprised in part of a forward steady-state model 147 which is operable to receive the steady-state input value $U_{ss}(t)$ and predict the steady-state output value $Y_{ss}(t)$. This predicted value is utilized in an inverse steady-state model 143 to receive the desired value $y^d(t)$ and the predicted output of the steady-state model 147 and predict a future steady-state input value or manipulated value $U_{ss}(t+N)$ and also a future steady-state input value $Y_{ss}(t+N)$ in addition to providing the steady-state gain $K_{ss}$. As described hereinabove, these are utilized to generate scaled b-values. These b-values are utilized to define the gain $k_d$ of the dynamic model. In can therefore be seen that this essentially takes a linear dynamic model with a fixed gain and allows it to have a gain thereof modified by a non-linear model as the operating point is moved through the output space.

Figure 10:
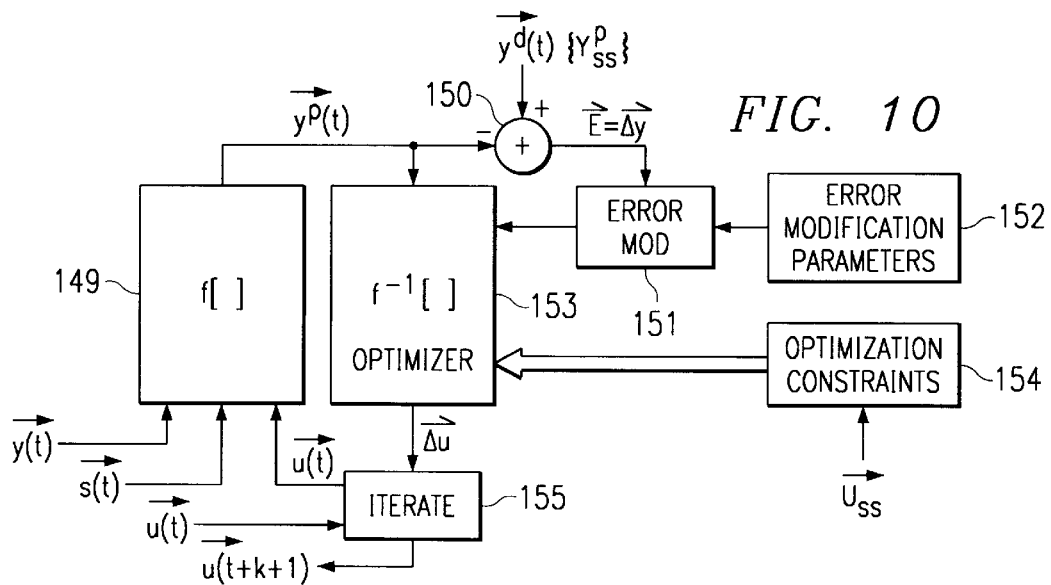
FIG. 10 illustrates a detail of the control network utilizing an error constraining algorithm.

Referring now to FIG. 10, there is illustrated a block diagram of the dynamic controller and optimizer. The dynamic controller includes a dynamic model 149 which basically defines the predicted value $y^p(k)$ as a function of the inputs y(t), s(t) and u(t). This was essentially the same model that was described hereinabove with reference to FIG. 9. The model 149 predicts the output values $y^p(k)$ between the two steady-state values, as will be described hereinbelow. The model 149 is predefined and utilizes an identification algorithm to identify the $a_1$, $a_2$, $b_1$ and $b_2$ coefficients during training. Once these are identified in a training and identification procedure, these are "fixed". However, as described hereinabove, the gain of the dynamic model is modified by scaling the coefficients $b_1$ and $b_2$. This gain scaling is not described with respect to the optimization operation of FIG. 10, although it can be incorporated in the optimization operation.

The output of model 149 is input to the negative input of a summing block 150. Summing block 150 sums the predicted output $y^p(k)$ with the desired output $y^d(t)$. In effect, the desired value of $y^d(t)$ is effectively the desired steady-state value $Y^f_{ss}$, although it can be any desired value. The output of the summing block 150 comprises an error value which is essentially the difference between the desired value $y^d(t)$ and the predicted value $y^p(k)$. The error value is modified by an error modification block 151, as will be described hereinbelow, in accordance with error modification parameters in a block 152. The modified error value is then input to an inverse model 153, which basically performs an optimization routine to predict a change in the input value u(t). In effect, the optimizer 153 is utilized in conjunction with the model 149 to minimize the error output by summing block 150. Any optimization function can be utilized, such as a Monte Carlo procedure. However, in the present invention, a gradient calculation is utilized. In the gradient method, the gradient $\partial(y)/\partial(u)$ is calculated and then a gradient solution performed as follows:

$$\Delta u_{new} = \Delta u_{old} + \left(\frac{\partial(y)}{\partial(u)}\right) \times E \tag{22}$$

The optimization function is performed by the inverse model 153 in accordance with optimization constraints in a block 154. An iteration procedure is performed with an iterate block 155 which is operable to perform an iteration with the combination of the inverse model 153 and the predictive model 149 and output on an output line 156 the future value u(t+k+1). For k=0, this will be the initial steady-state value and for k=N, this will be the value at the horizon, or at the next steady-state value. During the iteration procedure, the previous value of u(t+k) has the change value Au added thereto. This value is utilized for that value of k until the error is within the appropriate levels. Once it is at the appropriate level, the next u(t+k) is input to the model 149 and the value thereof optimized with the iterate block 155. Once the iteration procedure is done, it is latched. As will be described hereinbelow, this is a combination of modifying the error such that the actual error output by the block 150 is not utilized by the optimizer 153 but, rather, a modified error is utilized. Alternatively, different optimization constraints can be utilized, which are generated by the block 154, these being described hereinbelow.

Figure 11A:
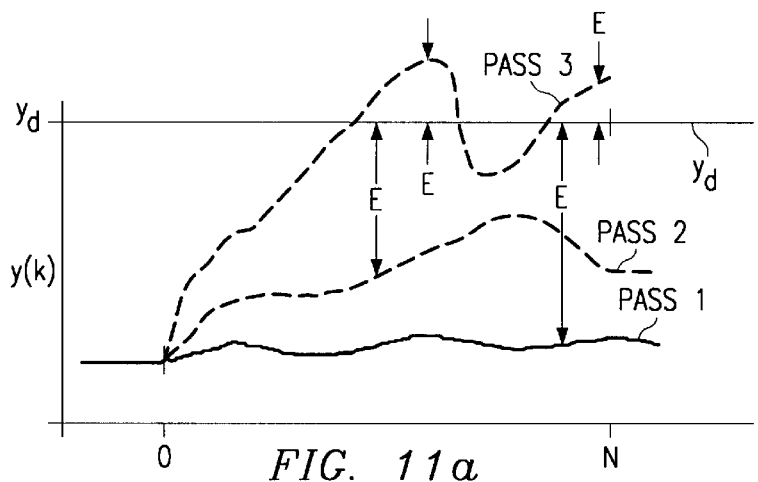
FIGS. 11a and 11b illustrate plots of the input and output during optimization.
Figure 11B:
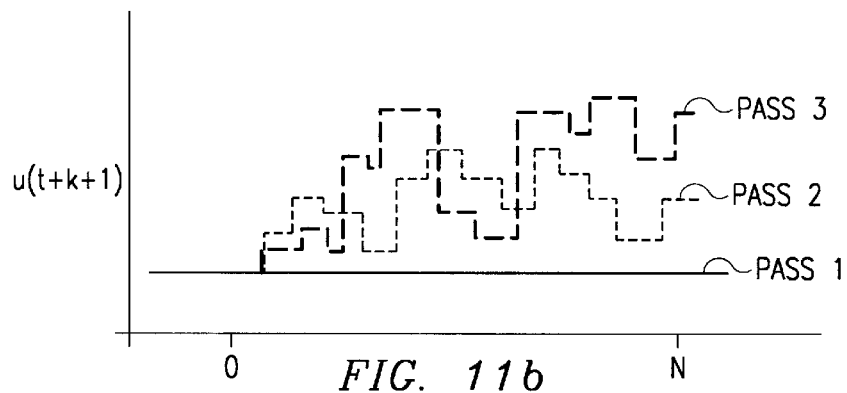

Referring now to FIGS. 11a and 11b, there are illustrated plots of the output y(t+k) and the input $u_K$(t+k+1), for each k from the initial steady-state value to the horizon steady-state value at k=N. With specific reference to FIG. 11a, it can be seen that the optimization procedure is performed utilizing multiple passes. In the first pass, the actual value $u^a$(t+k) for each k is utilized to determine the values of y(t+k) for each u,y pair. This is then accumulated and the values processed through the inverse model 153 and the iterate block 155 to minimize the error. This generates a new set of inputs $u_K$(t+k+1) illustrated in FIG. 11b. Therefore, the optimization after pass 1 generates the values of u(t+k+1) for the second pass. In the second pass, the values are again optimized in accordance with the various constraints to again generate another set of values for u(t+k+1). This continues until the overall objective function is reached.

This objective function is a combination of the operations as a function of the error and the operations as a function of the constraints, wherein the optimization constraints may control the overall operation of the inverse model 153 or the error modification parameters in block 152 may control the overall operation. Each of the optimization constraints will be described in more detail hereinbelow.

Figure 12:
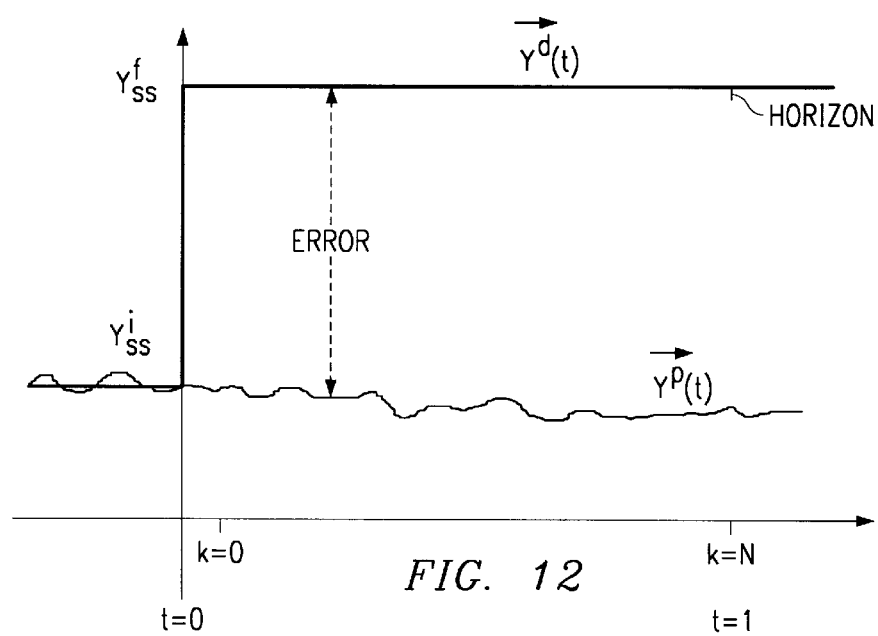
FIG. 12 illustrates a plot depicting desired and predicted behavior.

Referring now to FIG. 12, there is illustrated a plot of $y^d(t)$ and $y^p(t)$. The predicted value is represented by a waveform 170 and the desired output is represented by a waveform 172, both plotted over the horizon between an initial steady-state value $Y^i_{ss}$ and a final steady-state value $Y^f_{ss}$. It can be seen that the desired waveform prior to k=0 is substantially equal to the predicted output. At k=0, the desired output waveform 172 raises its level, thus creating an error. It can be seen that at k=0, the error is large and the system then must adjust the manipulated variables to minimize the error and force the predicted value to the desired value. The objective function for the calculation of error is of the form:

$$\min_{\Delta u_{il}} \sum_j \sum_k \left(A_j * (\vec{y}^p(t) - \vec{y}^d(t))\right)^2 \tag{23}$$

where:
 $Du_{il}$ is the change in input variable (IV) I at time interval l
 $A_j$ is the weight factor for control variable (CV) j
 $y^p_j(t)$ is the predicted value of CV j at time interval k
 $y^d_j(t)$ is the desired value of CV j.

Trajectory Weighting

Figure 13:
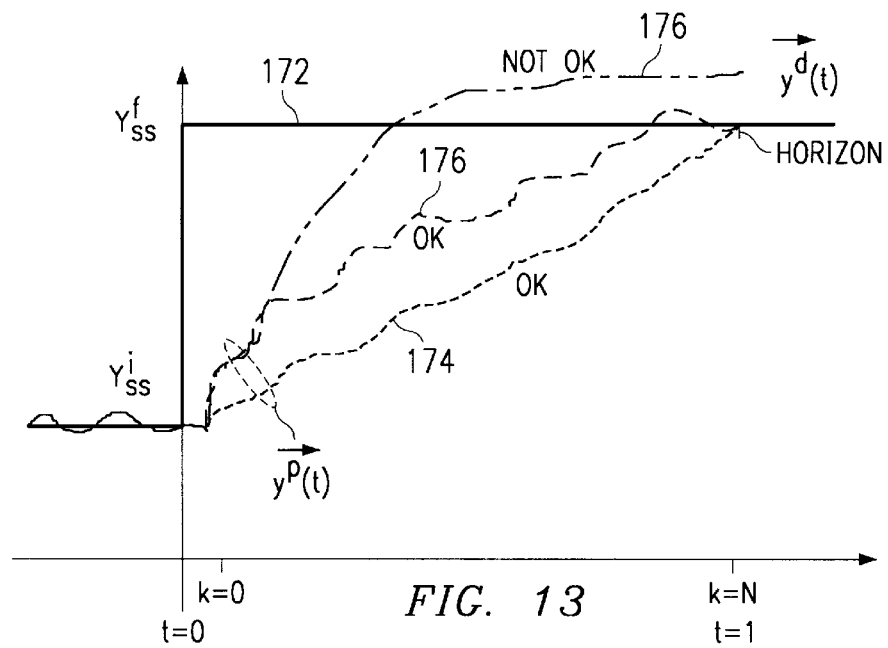
FIG. 13 illustrates various plots for controlling a system to force the predicted behavior to the desired behavior.

The present system utilizes what is referred to as "trajectory weighting" which encompasses the concept that one does not put a constant degree of importance on the future predicted process behavior matching the desired behavior at every future time set, i.e., at low k-values. One approach could be that one is more tolerant of error in the near term (low k-values) than farther into the future (high k-values). The basis for this logic is that the final desired behavior is more important than the path taken to arrive at the desired behavior, otherwise the path traversed would be a step function. This is illustrated in FIG. 13 wherein three possible predicted behaviors are illustrated, one represented by a curve 174 which is acceptable, one is represented by a different curve 176, which is also acceptable and one represented by a curve 178, which is unacceptable since it goes above the desired level on curve 172. Curves 174–178 define the desired behavior over the horizon for k=1 to N.

Figure 14:
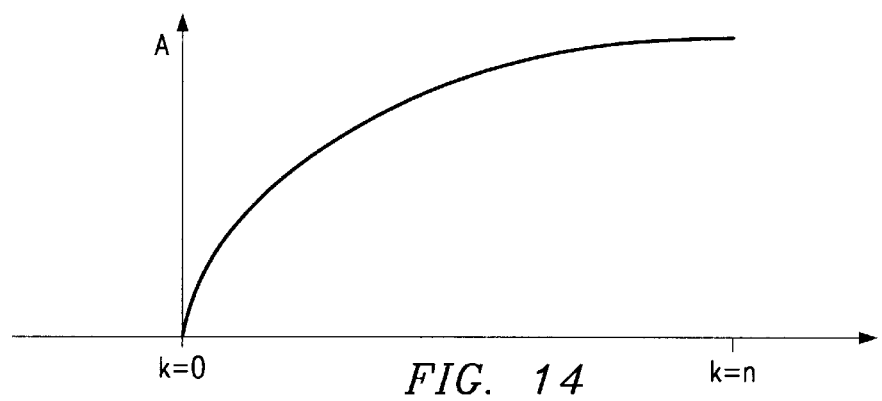
FIG. 14 illustrates a plot of a trajectory weighting algorithm.

In Equation 23, the predicted curves 174–178 would be achieved by forcing the weighting factors $A_j$ to be time varying. This is illustrated in FIG. 14. In FIG. 14, the weighting factor A as a function of time is shown to have an increasing value as time and the value of k increases. This results in the errors at the beginning of the horizon (low k-values) being weighted much less than the errors at the end of the horizon (high k-values). The result is more significant than merely redistributing the weights out to the end of the control horizon at k=N. This method also adds robustness, or the ability to handle a mismatch between the process and the prediction model. Since the largest error is usually experienced at the beginning of the horizon, the largest changes in the independent variables will also occur at this point. If there is a mismatch between the process and the prediction (model error), these initial moves will be large and somewhat incorrect, which can cause poor performance and eventually instability. By utilizing the trajectory weighting method, the errors at the beginning of the horizon are weighted less, resulting in smaller changes in the independent variables and, thus, more robustness.

Error Constraints

Figure 15:
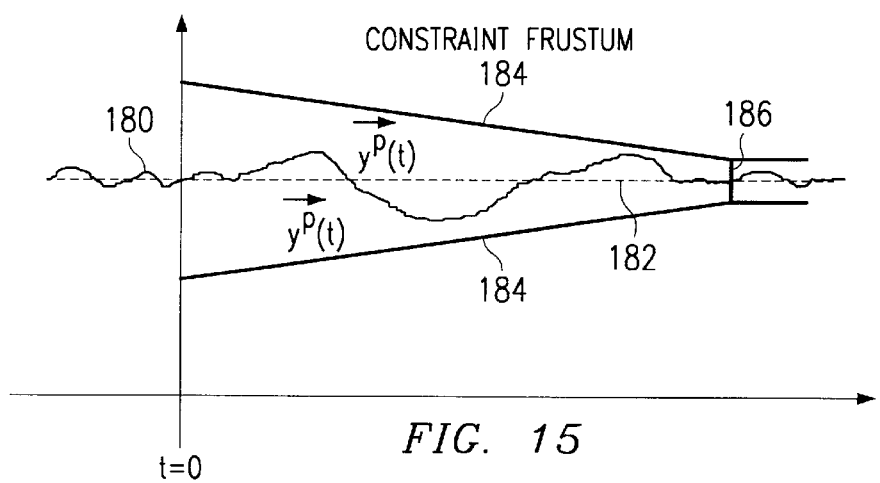
FIG. 15 illustrates a plot for one type of constraining algorithm.

Referring now to FIG. 15, there are illustrated constraints that can be placed upon the error. There is illustrated a predicted curve 180 and a desired curve 182, desired curve 182 essentially being a flat line. It is desirable for the error between curve 180 and 182 to be minimized. Whenever a transient occurs at t=0, changes of some sort will be required. It can be seen that prior to t=0, curve 182 and 180 are substantially the same, there being very little error between the two. However, after some type of transition, the error will increase. If a rigid solution were utilized, the system would immediately respond to this large error and attempt to reduce it in as short a time as possible. However, a constraint frustum boundary 184 is provided which allows the error to be large at t=0 and reduces it to a minimum level at a point 186. At point 186, this is the minimum error, which can be set to zero or to a non-zero value, corresponding to the noise level of the output variable to be controlled. This therefore encompasses the same concepts as the trajectory weighting method in that final future behavior is considered more important that near term behavior. The ever shrinking minimum and/or maximum bounds converge from a slack position at t=0 to the actual final desired behavior at a point 186 in the constraint frustum method.

The difference between constraint frustum and trajectory weighting is that constraint frustums are an absolute limit (hard constraint) where any behavior satisfying the limit is just as acceptable as any other behavior that also satisfies the limit. Trajectory weighting is a method where differing behaviors have graduated importance in time. It can be seen that the constraints provided by the technique of FIG. 15 requires that the value $y^P(t)$ is prevented from exceeding the constraint value. Therefore, if the difference between $y^d(t)$ and $y^P(t)$ is greater than that defined by the constraint boundary, then the optimization routine will force the input values to a value that will result in the error being less than the constraint value. In effect, this is a "clamp" on the difference between $y^P(t)$ and $y^d(t)$. In the trajectory weighting method, there is no "clamp" on the difference therebetween; rather, there is merely an attenuation factor placed on the error before input to the optimization network.

Trajectory weighting can be compared with other methods, there being two methods that will be described herein, the dynamic matrix control (DMC) algorithm and the identification and command (IdCom) algorithm. The DMC algorithm utilizes an optimization to solve the control problem by minimizing the objective function:

$$\min_{\Delta U_{il}} \sum_j \sum_k \left( A_j * (\bar{y}^P(t) - \bar{y}^D(t)) + \sum_i B_i * \sum_1 (\Delta U_{il})^2 \right) \quad (24)$$

where $B_i$ is the move suppression factor for input variable I. This is described in Cutler, C. R and B. L. Ramaker, Dynamic Matrix Control—A Computer Control Algorithm, AIChE National Meeting, Houston, Tex. (April, 1979), which is incorporated herein by reference.

It is noted that the weights $A_j$ and desired values $y^d(t)$ are constant for each of the control variables. As can be seen from Equation 24, the optimization is a trade off between minimizing errors between the control variables and their desired values and minimizing the changes in the independent variables. Without the move suppression term, the independent variable changes resulting from the set point changes would be quite large due to the sudden and immediate error between the predicted and desired values. Move suppression limits the independent variable changes, but for all circumstances, not just the initial errors.

Figure 16:
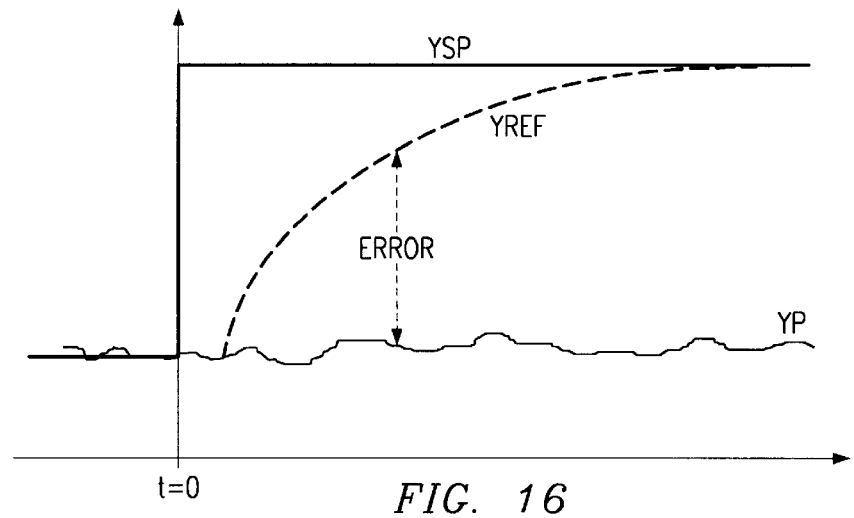
FIG. 16 illustrates a plot of the error algorithm as a function of time.

The IdCom algorithm utilizes a different approach. Instead of a constant desired value, a path is defined for the control variables to take from the current value to the desired value. This is illustrated in FIG. 16. This path is a more gradual transition from one operation point to the next. Nevertheless, it is still a rigidly defined path that must be met. The objective function for this algorithm takes the form:

$$\min_{\Delta U_{il}} \sum_j \sum_k \left( A_j * (Y^{P_{jk}} - y_{refjk}) \right)^2 \quad (25)$$

This technique is described in Richalet, J., A. Rault, J. L. Testud, and J. Papon, Model Predictive Heuristic Control: Applications to Industrial Processes, Automatica, 14, 413–428 (1978), which is incorporated herein by reference. It should be noted that the requirement of Equation 25 at each time interval is sometimes difficult. In fact, for control variables that behave similarly, this can result in quite erratic independent variable changes due to the control algorithm attempting to endlessly meet the desired path exactly.

Control algorithms such as the DMC algorithm that utilize a form of matrix inversion in the control calculation, cannot handle control variable hard constraints directly. They must treat them separately, usually in the form of a steady-state linear program. Because this is done as a steady-state problem, the constraints are time invariant by definition. Moreover, since the constraints are not part of a control calculation, there is no protection against the controller violating the hard constraints in the transient while satisfying them at steady-state.

With further reference to FIG. 15, the boundaries at the end of the envelope can be defined as described hereinbelow. One technique described in the prior art, W. Edwards Deming, "Out of the Crisis," Massachusetts Institute of Technology, Center for Advanced Engineering Study, Cambridge Mass., Fifth Printing, September 1988, pages 327–329, describes various Monte Carlo experiments that set forth the premise that any control actions taken to correct for common process variation actually may have a negative impact, which action may work to increase variability rather than the desired effect of reducing variation of the controlled processes. Given that any process has an inherent accuracy, there should be no basis to make a change based on a difference that lies within the accuracy limits of the system utilized to control it. At present, commercial controllers fail to recognize the fact that changes are undesirable, and continually adjust the process, treating all deviation from target, no matter how small, as a special cause deserving of control actions, i.e., they respond to even minimal changes. Over adjustment of the manipulated variables therefore will result, and increase undesirable process variation. By placing limits on the error with the present filtering algorithms described herein, only controller actions that are proven to be necessary are allowed, and thus, the process can settle into a reduced variation free from unmerited controller disturbances. The following discussion will deal with one technique for doing this, this being based on statistical parameters.

Filters can be created that prevent model-based controllers from taking any action in the case where the difference between the controlled variable measurement and the desired target value are not significant. The significance level is defined by the accuracy of the model upon which the controller is statistically based. This accuracy is determined as a function of the standard deviation of the error and a predetermined confidence level. The confidence level is based upon the accuracy of the training. Since most training sets for a neural network-based model will have "holes" therein, this will result in inaccuracies within the mapped space. Since a neural network is an empirical model, it is only as accurate as the training data set. Even though the model may not have been trained upon a given set of inputs, it will extrapolate the output and predict a value given a set of inputs, even though these inputs are mapped across a space that is questionable. In these areas, the confidence level in the predicted output is relatively low. This is described in detail in U.S. patent application Ser. No. 08/025,184, filed Mar. 2, 1993, which is incorporated herein by reference.

Figure 17:
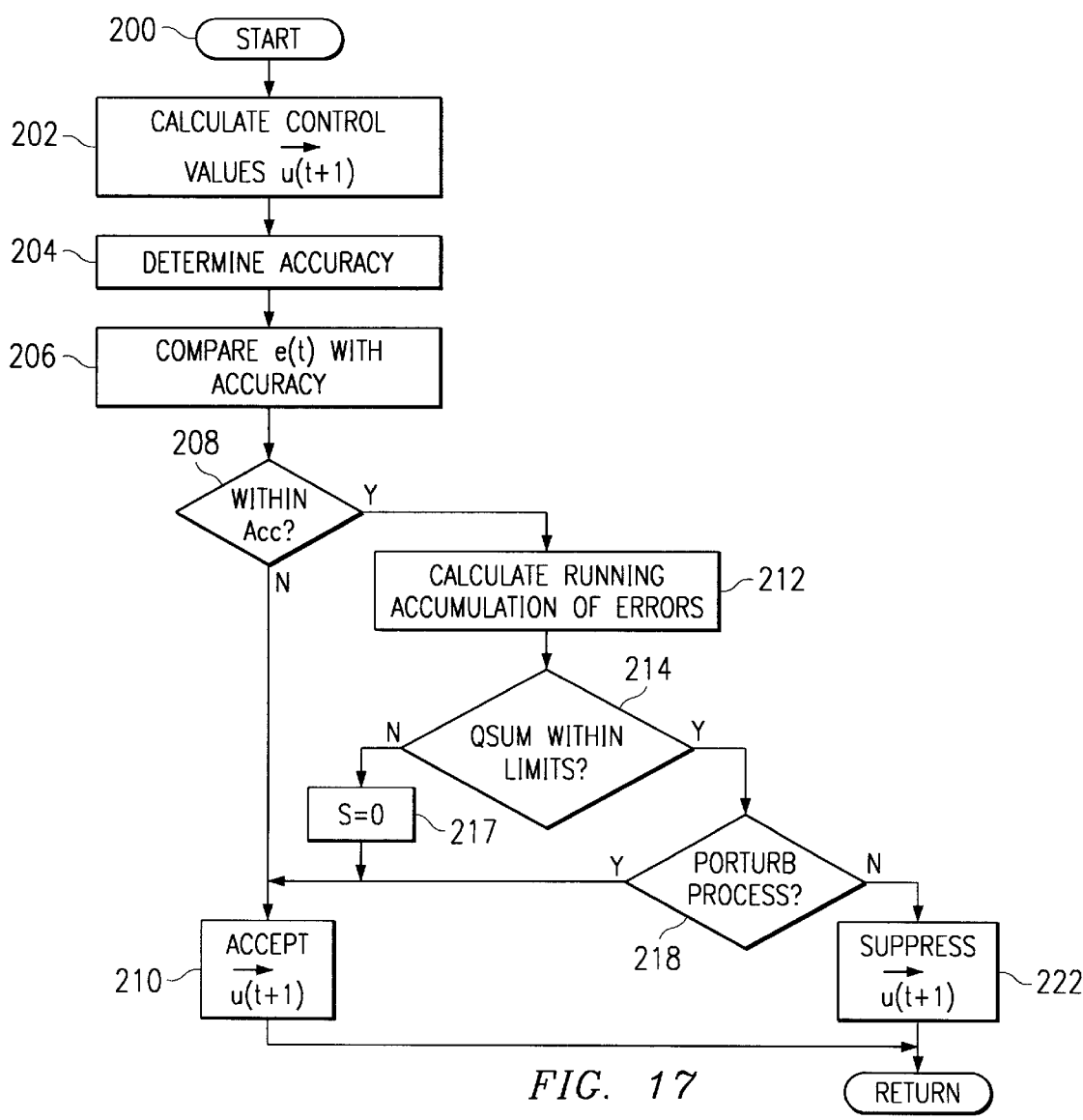
FIG. 17 illustrates a flowchart depicting the statistical method for generating the filter and defining end point for the constraining algorithm of FIG. 15.

Referring now to FIG. 17, there is illustrated a flowchart depicting the statistical method for generating the filter and defining the end point 186 in FIG. 15. The flowchart is initiated at a start block 200 and then proceeds to a function block 202, wherein the control values u(t+1) are calculated. However, prior to acquiring these control values, the filtering operation must be processed. The program will flow to a function block 204 to determine the accuracy of the controller. This is done off-line by analyzing the model predicted values compared to the actual values, and calculating the standard deviation of the error in areas where the target is undisturbed. The model accuracy of $e_m(t)$ is defined as follows:

$$e_m(t) = a(t) - p(t) \tag{26}$$

where:
$e_m$=model error,
a=actual value
p=model predicted value

The model accuracy is defined by the following equation:

$$Acc = H * \sigma_m \tag{27}$$

where:
Acc=accuracy in terms of minimal detector error
H=significance level=1 67% confidence
   =2 95% confidence
   =3 99.5% confidence
$\sigma_m$=standard deviation of $e_m(t)$.

The program then flows to a function block 206 to compare the controller error $e_c(t)$ with the model accuracy. This is done by taking the difference between the predicted value (measured value) and the desired value. This is the controller error calculation as follows:

$$e_c(t) = d(t) - m(t) \tag{28}$$

where:
$e_c$=controller error
d=desired value
m=measured value

The program will then flow to a decision block 208 to determine if the error is within the accuracy limits. The determination as to whether the error is within the accuracy limits is done utilizing Shewhart limits. With this type of limit and this type of filter, a determination is made as to whether the controller error $e_c(t)$ meets the following conditions: $e_c(t) \geq -1*Acc$ and $e_c(t) \leq +1*Acc$, then either the control action is suppressed or not suppressed. If it is within the accuracy limits, then the control action is suppressed and the program flows along a "Y" path. If not, the program will flow along the "N" path to function block 210 to accept the u(t+1) values. If the error lies within the controller accuracy, then the program flows along the "Y" path from decision block 208 to a function block 212 to calculate the running accumulation of errors. This is formed utilizing a CUSUM approach. The controller CUSUM calculations are done as follows:

$$S_{low} = \min(0, S_{low}(t-1) + d(t) - m(t)) - \Sigma(m) + k) \tag{29}$$

$$S_{hi} = \max(0, S_{hi}(t-1) + [d(t) - m(t)) - \Sigma(m)] - k) \tag{30}$$

where:
$S_{hi}$=Running Positive Qsum
$S_{low}$=Running Negative Qsum
k=Tuning factor—minimal detectable change threshold with the following defined:
Hq=significance level. Values of (j,k) can be found so that the CUSUM control chart will have significance levels equivalent to Shewhart control charts.

The program will then flow to a decision block 214 to determine if the CUSUM limits check out, i.e., it will determine if the Qsum values are within the limits. If the Qsum, the accumulated sum error, is within the established limits, the program will then flow along the "Y" path. And, if it is not within the limits, it will flow along the "N" path to accept the controller values u(t+1). The limits are determined if both the value of $S_{hi} \geq +1*Hq$ and $S_{low} \leq -1*Hq$. Both of these actions will result in this program flowing along the "Y" path. If it flows along the "N" path, the sum is set equal to zero and then the program flows to the function block 210. If the Qsum values are within the limits, it flows along the "Y" path to a function block 218 wherein a determination is made as to whether the user wishes to perturb the process. If so, the program will flow along the "Y" path to the function block 210 to accept the control values u(t+1). If not, the program will flow along the "N" path from decision block 218 to a function block 222 to suppress the controller values u(t+1). The decision block 218, when it flows along the "Y" path, is a process that allows the user to re-identify the model for on-line adaptation, i.e., retrain the model. This is for the purpose of data collection and once the data has been collected, the system is then reactivated.

Figure 18:
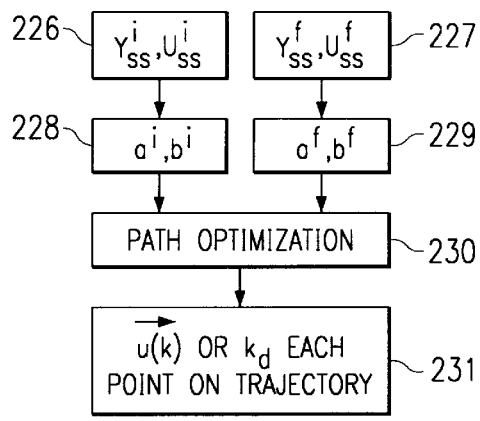
FIG. 18 illustrates a diagrammatic view of the optimization process.

Referring now to FIG. 18, there is illustrated a block diagram of the overall optimization procedure. In the first step of the procedure, the initial steady-state values $\{Y_{ss}^i, U_{ss}^i\}$ and the final steady-state values $\{Y_{ss}^f, U_{ss}^f\}$ are determined, as defined in blocks 226 and 228, respectively. In some calculations, both the initial and the final steady-state values are required. The initial steady-state values are utilized to define the coefficients $a^i$, $b^i$ in a block 228. As described above, this utilizes the coefficient scaling of the b-coefficients. Similarly, the steady-state values in block 227 are utilized to define the coefficients $a^f$, $b^f$, it being noted that only the b-coefficients are also defined in a block 229. Once the beginning and end points are defined, it is then necessary to determine the path therebetween. This is provided by block 230 for path optimization. There are two methods for determining how the dynamic controller traverses this path. The first, as described above, is to define the approximate dynamic gain over the path from the initial gain to the final gain. As noted above, this can incur some instabilities. The second method is to define the input values over the horizon from the initial value to the final value such that the desired value $Y_{ss}^f$ is achieved. Thereafter, the gain can be set for the dynamic model by scaling the b-coefficients. As noted above, this second method does not necessarily force the predicted value of the output $y^p(t)$ along a defined path; rather, it defines the characteristics of the model as a function of the error between the predicted and actual values over the horizon from the initial value to the final or desired value. This effectively defines the input values for each point on the trajectory or, alternatively, the dynamic gain along the trajectory.

Figure 18A:
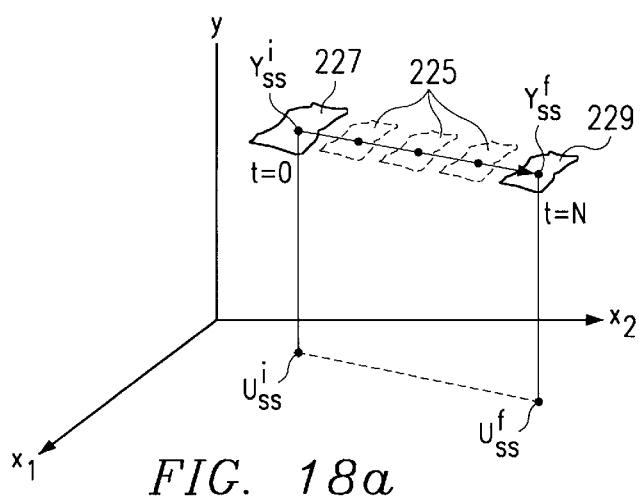
FIG. 18a illustrates a diagrammatic representation of the manner in which the path between steady-state values is mapped through the input and output space.

Referring now to FIG. 18a, there is illustrated a diagrammatic representation of the manner in which the path is mapped through the input and output space. The steady-state model is operable to predict both the output steady-state value $Y_{ss}^i$ at a value of k=0, the initial steady-state value, and the output steady-state value $Y_m^i$ at a time t+N where k=N, the final steady-state value. At the initial steady-state value, there is defined a region 227, which region 227 comprises a surface in the output space in the proximity of the initial steady-state value, which initial steady-state value also lies in the output space. This defines the range over which the dynamic controller can operate and the range over which it is valid. At the final steady-state value, if the gain were not changed, the dynamic model would not be valid. However, by utilizing the steady-state model to calculate the steady-state gain at the final steady-state value and then force the gain of the dynamic model to equal that of the steady-state model, the dynamic model then becomes valid over a region 229, proximate the final steady-state value. This is at a value of k=N. The problem that arises is how to define the path between the initial and final steady-state values. One possibility, as mentioned hereinabove, is to utilize the steady-state model to calculate the steady-state gain at multiple points along the path between the initial steady-state value and the final steady-state value and then define the dynamic gain at those points. This could be utilized in an optimization routine, which could require a large number of calculations. If the computational ability were there, this would provide a continuous calculation for the dynamic gain along the path traversed between the initial steady-state value and the final steady-state value utilizing the steady-state gain. However, it is possible that the steady-state model is not valid in regions between the initial and final steady-state values, i.e., there is a low confidence level due to the fact that the training in those regions may not be adequate to define the model therein. Therefore, the dynamic gain is approximated in these regions, the primary goal being to have some adjustment of the dynamic model along the path between the initial and the final steady-state values during the optimization procedure. This allows the dynamic operation of the model to be defined. This is represented by a number of surfaces 225 as shown in phantom.

Figure 19:
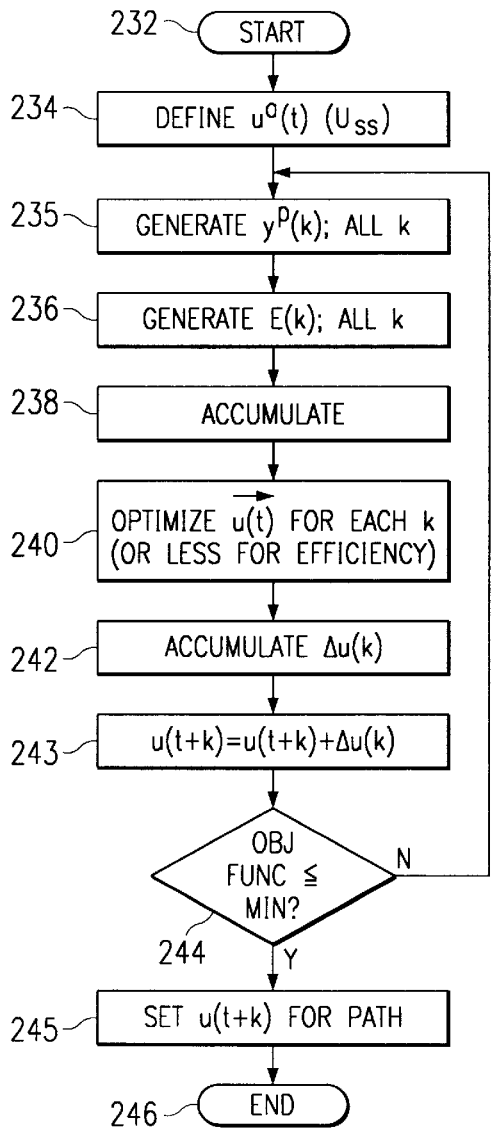
FIG. 19 illustrates a flowchart for the optimization procedure.

Referring now to FIG. 19, there is illustrated a flow chart depicting the optimization algorithm. The program is initiated at a start block 232 and then proceeds to a function block 234 to define the actual input values $u^a(t)$ at the beginning of the horizon, this typically being the steady-state value $U_{ss}$. The program then flows to a function block 235 to generate the predicted values $y^p(k)$ over the horizon for all k for the fixed input values. The program then flows to a function block 236 to generate the error E(k) over the horizon for all k for the previously generated $y^p(k)$. These errors and the predicted values are then accumulated, as noted by function block 238. The program then flows to a function block 240 to optimize the value of u(t) for each value of k in one embodiment. This will result in k-values for u(t). Of course, it is sufficient to utilize less calculations than the total k-calculations over the horizon to provide for a more efficient algorithm. The results of this optimization will provide the predicted change Δu(t+k) for each value of k in a function block 242. The program then flows to a function block 243 wherein the value of u(t+k) for each u will be incremented by the value Δu(t+k). The program will then flow to a decision block 244 to determine if the objective function noted above is less than or equal to a desired value. If not, the program will flow back along an "N" path to the input of function block 235 to again make another pass. This operation was described above with respect to FIGS. 11a and 11b. When the objective function is in an acceptable level, the program will flow from decision block 244 along the "Y" path to a function block 245 to set the value of u(t+k) for all u. This defines the path. The program then flows to an End block 246.

Steady State Gain Determination

Figure 20:
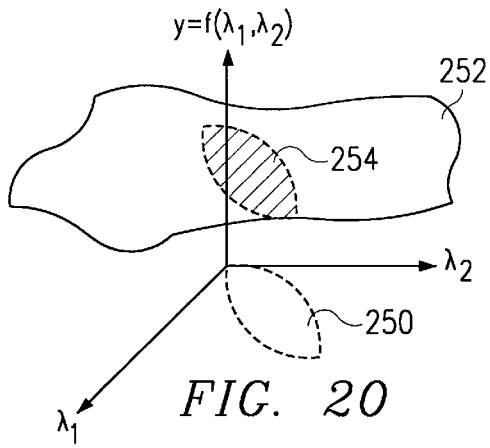
FIG. 20 illustrates a diagrammatic view of the input space and the error associated therewith.
Figure 21:
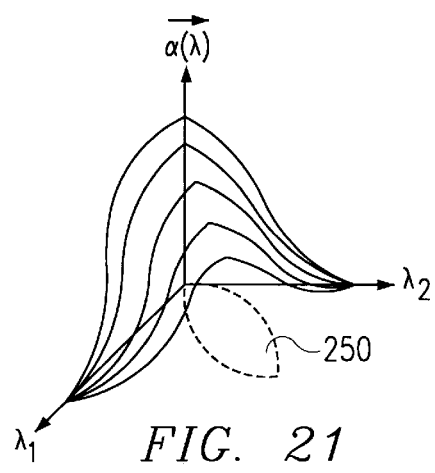
FIG. 21 illustrates a diagrammatic view of the confidence factor in the input space.

Referring now to FIG. 20, there is illustrated a plot of the input space and the error associated therewith. The input space is comprised of two variables $x_1$ and $x_2$. The y-axis represents the function $f(x_1, x_2)$. In the plane of $x_1$ and $x_2$, there is illustrated a region 250, which represents the training data set. Areas outside of the region 250 constitute regions of no data, i.e., a low confidence level region. The function Y will have an error associated therewith. This is represented by a plane 252. However, the error in the plane 250 is only valid in a region 254, which corresponds to the region 250. Areas outside of region 254 on plane 252 have an unknown error associated therewith. As a result, whenever the network is operated outside of the region 250 with the error region 254, the confidence level in the network is low. Of course, the confidence level will not abruptly change once outside of the known data regions but, rather, decreases as the distance from the known data in the training set increases. This is represented in FIG. 21 wherein the confidence is defined as α(x). It can be seen from FIG. 21 that the confidence level α(x) is high in regions overlying the region 250.

Once the system is operating outside of the training data regions, i.e., in a low confidence region, the accuracy of the neural net is relatively low. In accordance with one aspect of the preferred embodiment, a first principles model g(x) is utilized to govern steady-state operation. The switching between the neural network model f(x) and the first principle models g(x) is not an abrupt switching but, rather, it is a mixture of the two.

The steady-state gain relationship is defined in Equation 7 and is set forth in a more simple manner as follows:

$$K(\vec{u}) = \frac{\partial(f(\vec{u}))}{\partial(\vec{u})} \tag{31}$$

A new output function Y(u) is defined to take into account the confidence factor α(u) as follows:

$$Y(\vec{u}) = \alpha(\vec{u}) \cdot f(\vec{u}) + (1 - \alpha(\vec{u}))g(\vec{u}) \tag{32}$$

where:

α(u)=confidence in model f(u)

α(u) in the range of 0–1

α(u) ∈ {0,1}

This will give rise to the relationship:

$$K(\vec{u}) = \frac{\partial(Y(\vec{u}))}{\partial(\vec{u})} \quad (33)$$

In calculating the steady-state gain in accordance with this Equation utilizing the output relationship Y(u), the following will result:

$$K(\vec{u}) = \frac{\partial(\alpha(\vec{u}))}{\partial(\vec{u})} \times F(\vec{u}) + \alpha(\vec{u})\frac{\partial(F(\vec{u}))}{\partial(\vec{u})} + \frac{\partial(1-\alpha(\vec{u}))}{\partial(\vec{u})} \times g(\vec{u}) + (1-\alpha(\vec{u}))\frac{\partial(g(\vec{u}))}{\partial(\vec{u})} \quad (34)$$

Figure 22:
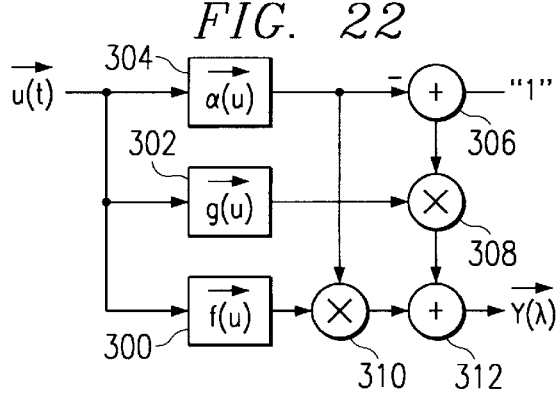
FIG. 22 illustrates a block diagram of the method for utilizing a combination of a non-linear system and a first principals system.

Referring now to FIG. 22, there is illustrated a block diagram of the embodiment for realizing the switching between the neural network model and the first principles model. A neural network block 300 is provided for the function f(u), a first principle block 302 is provided for the function g(u) and a confidence level block 304 for the function α(u). The input u(t) is input to each of the blocks 300–304. The output of block 304 is processed through a subtraction block 306 to generate the function 1−α(u), which is input to a multiplication block 308 for multiplication with the output of the first principles block 302. This provides the function (1−α(u))*g(u). Additionally, the output of the confidence block 304 is input to a multiplication block 310 for multiplication with the output of the neural network block 300. This provides the function f(u)*α(u). The output of block 308 and the output of block 310 are input to a summation block 312 to provide the output Y(u).

Figure 23:
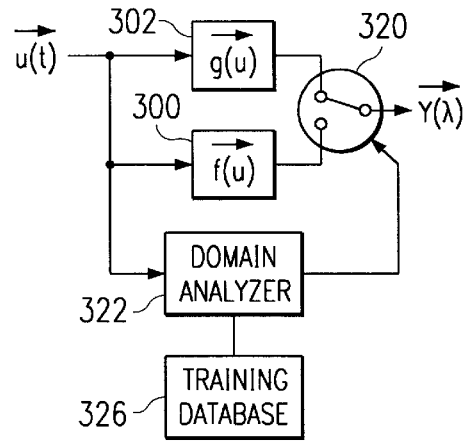
FIG. 23 illustrates an alternate embodiment of the embodiment of FIG. 22.

Referring now to FIG. 23, there is illustrated an alternate embodiment which utilizes discreet switching. The output of the first principles block 302 and the neural network block 300 are provided and are operable to receive the input x(t). The output of the network block 300 and first principles block 302 are input to a switch 320, the switch 320 operable to select either the output of the first principals block 302 or the output of the neural network block 300. The output of the switch 320 provides the output Y(u).

The switch 320 is controlled by a domain analyzer 322. The domain analyzer 322 is operable to receive the input x(t) and determine whether the domain is one that is within a valid region of the network 300. If not, the switch 320 is controlled to utilize the first principles operation in the first principles block 302. The domain analyzer 322 utilizes the training database 326 to determine the regions in which the training data is valid for the network 300. Alternatively, the domain analyzer 320 could utilize the confidence factor α(u) and compare this with a threshold, below which the first principles model 302 would be utilized.

Identification of Dynamic Models

Gain information, as noted hereinabove, can also be utilized in the development of dynamic models. Instead of utilizing the user-specified gains, the gains may be obtained from a trained steady-state model. Although described hereinabove with reference to Equation 7, a single input, single output dynamic model will be defined by a similar equation as follows:

$$\hat{y}(t) = -a_1\hat{y}(t-1) - a_2\hat{y}(t-2) + b_1u(t-d-1) + b_2u(t-d-2) \quad (35)$$

where the dynamic steady-state gain is defined as follows:

$$k_d = \frac{b_1 + b_2}{1 + a_1 + a_2} \quad (36)$$

This gain relationship is essentially the same as defined hereinabove in Equation 11. Given a time series of input and output data, u(t) and y(t), respectively, and the steady-state or static gain associated with the average value of the input, $K'_{ss}$, the parameters of the dynamic system may be defined by minimizing the following cost function:

$$J = \lambda(k_d - K'_{ss})^2 + \sum_{t=t_i}^{t_f} (y^P(t) - y(t))^2 \quad (37)$$

where λ is a user-specified value. It is noted that the second half of Equation 37 constitutes the summation over the time series with the value y(t) constituting the actual output and the function $y^P(t)$ constituting the predicted output values. The mean square error of this term is summed from an initial time $t_i$ to a final time $t_f$, constituting the time series. The gain value $k_d$ basically constitutes the steady-state gain of the dynamic model. This optimization is subject to the following constraints on dynamic stability:

$$0 \leq a_2 < 1 \quad (38)$$

$$-a_2 - 1 < a_1 < 0 \quad (39)$$

which are conventional constraints. The variable λ is used to enforce the average steady-state gain, $K'_{ss}$, in the identification of the dynamic model. The value $K'_{ss}$ is found by calculating the average value of the steady-state gain associated with the neural network over the time horizon $t_i$ to $t_f$. Given the input time series $u(t_i)$ to $u(t_f)$, the $K'_{ss}$ is defined as follows:

$$K'_{ss} = \frac{1}{t_f - t_i} \sum_{t=t_i}^{t_f} K_{ss}(t) \quad (40)$$

For a large value of λ, the gain of the steady-state and dynamic models are forced to be equal. For a small value of λ, the gain of the dynamic model is found independently from that of the steady-state model. For λ=0, the optimization problem is reduced to a technique commonly utilized in identification of output equation-based models, as defined in L. Ljung, "System Identification: Theory for the User," Prentice-Hall, Englewood Cliffs, N.J. 1987.

In defining the dynamic model in accordance with Equation No. 37, it is recognized that only three parameters need to be optimized, the $a_1$ parameter, the $a_2$ parameter and the ratio of $b_1$ and $b_2$. This is to be compared with the embodiment described hereinabove with reference to FIG. 2, wherein the dynamic gain was forced to be equal to the steady-state gain of the static model 20. By utilizing the weighting factor λ and minimizing the cost function in accordance with Equation 37 without requiring the dynamic gain $k_d$ to equal the steady-state gain $K'_{ss}$ of the neural network, some latitude is provided in identifying the dynamic model.

In the embodiment described above with respect to FIG. 2, the model was identified by varying the b-values with the dynamic gain forced to be equal to the steady-state gain. In the embodiment illustrated above with respect to Equation 37, the dynamic gain does not necessarily have to equal the steady-state gain $K'_{ss}$, depending upon the value of $\lambda$ defining the weighting factor.

The above noted technique of Equation 37 provides for determining the a's and b's of the dynamic model as a method of identification in a particular localized region of the input space. Once the a's and b's of the dynamic model are known, this determines the dynamics of the system with the only variation over the input space from the localized region in which the dynamic step test data was taken being the dynamic gain $k_d$. If this gain is set to a value of one, then the only component remaining are the dynamics. Therefore, the dynamic model, once defined, then has its gain scaled to a value of one, which merely requires adjusting the b-values. This will be described hereinbelow. After identification of the model, it is utilized as noted hereinabove with respect to the embodiment of FIG. 2 and the dynamic gain can then be defined for each region utilizing the static gain.

Steady-State Model Identification

As noted hereinabove, to optimize and control any process, a model of that process is needed. The present system relies on a combination of steady-state and dynamic models. The quality of the model determines the overall quality of the final control of the plant. Various techniques for training a steady-state model will be described hereinbelow.

Prior to discussing the specific model identification method utilized in the present invention, it is necessary to define a quasi-steady-state model. For comparison, a steady-state model will be defined as follows:

Steady-State Models:

A steady-state model is represented by the static mapping from the input, u(t) to the output y(t) as defined by the following equation:

$$\overline{y}(t) = F(\overline{u}(t)) \qquad (41)$$

where F(u(t)) models the steady-state mapping of the process and $u(t) \in R^m$ and $y(t) \in R^n$ represent the inputs and outputs of a given process. It should be noted that the input, u(t), and the output, y(t), are not a function of time and, therefore, the steady-state mapping is independent of time. The gain of the process must be defined with respect to a point in the input space. Given the point $\overline{u}(t)$, the gain of process is defined as:

$$G(\vec{u}(t)) = \left. \frac{d\vec{y}}{d\vec{u}} \right|_{u(t)} \qquad (42)$$

where G is a $R^{m \times n}$ matrix. This gain is equivalent to the sensitivity of the function F(u(t)).

Quasi-Steady-State Models:

A steady-state model by definition contains no time information. In some cases, to identify steady-state models, it is necessary to introduce time information into the static model:

$$\overline{y}(t) = G(\overline{u}(t,d)) \qquad (43)$$

where:

$$\overline{u}(t,d) = [u_1(t-d_1) u_2(t-d_2) \ldots u_m(t-d_m)] \qquad (44)$$

Figure 24:
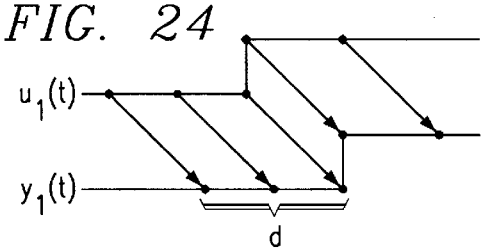
FIG. 24 illustrates a plot of a pair of data with a defined delay associated therewith.

The variable $d_i$ represents the delay associated with the $i^{th}$ input. In the quasi-steady-state model, the static mapping of G(u(t)) is essentially equal to the steady-state mapping F(u(t)). The response of such a model is illustrated in FIG. 24. In FIG. 24, there is illustrated a single input $u_1(t)$ and a single output $y_1(t)$, this being a single output, single input system. There is a delay, or dead time d, noted between the input and the output which represents a quasi-steady-state dynamic. It is noted, however, that each point on the input $u_1(t)$ corresponds to a given point on the output $y_1(t)$ by some delay d. However, when $u_1(t)$ makes a change from an initial value to a final value, the output makes basically an instantaneous change and follows it. With respect to the quasi-steady-state model, the only dynamics that are present in this model is the delay component.

Identification of Delays in Quasi-Steady-State Models

Given data generated by a quasi-steady-state model of the form $$y(t) = G(\overline{u}(t-d)), \qquad (45)$$

where d is the dead-time or delay noted in FIG. 24, the generating function G( ) is approximated via a neural network training algorithm (nonlinear regression) when d is known. That is, a function G( ) is fitted to a set of data points generated from G( ), where each data point is a u(t), y(t) pair. The present system concerns time-series data, and thus the dataset is indexed by t. The data set is denoted by D.

In process modeling, exact values for d are ordinarily not critical to the quality of the model; approximate values typically suffice. Prior art systems specified a method for approximating d by training a model with multiple delays per input, and picking the delay which has the largest sensitivity (average absolute partial derivative of output w.r.t. input). In these prior art systems, the sensitivity was typically determined by manipulating a given input and determining the effect thereof on the output. By varying the delay, i.e., taking a different point of data in time with respect to a given y(t) value, a measure of sensitivity of the output on the input can be determined as a function of the delay. By taking the delay which exhibits the largest sensitivity, the delay of the system can be determined.

The disadvantage to the sensitivity technique is that it requires a number of passes through the network during training in order to determine the delay. This is an iterative technique. In accordance with the present system, the method for approximating the delay is done utilizing a statistical method for examining the data, as will be described in more detail hereinbelow. This method is performed without requiring actual neural network training during the determination operation. The method of the present invention examines each input variable against a given output variable, independently of the other input variables. Given $d_i$ for an input variable $u_i$, the method measures the strength of the relationship between $u_i(t-d_i)$ and y(t). The method is fast, such that many $d_i$ values may be tested for each $u_i$.

The user supplies $d_{i,min}$ and $d_{i,max}$ values for each $u_i$. The strength of the relationship between $u_i(t-d_i)$ and y(t) is computed for each $d_i$ between $d_{i,min}$ and $d_{i,max}$ (inclusive). The $d_i$ yielding the strongest relationship between $u_i(t-d_i)$ and y(t) is chosen as the approximation of the dead-time for that input variable on the given output variable. The strength of the relationship between $u_i(t-d_i)$ and y(t) is defined as the degree of statistical dependence between $u_i(t-d_i)$ and y(t). The degree of statistical dependence between $u_i(t-d_i)$ and y(t) is the degree to which $ui(t-d_i)$ and y(t) are not statistically independent.

Statistical dependence is a general concept. As long as there is any relationship whatsoever between two variables, of whatever form, linear or nonlinear, the definition of statistical independence for those two variables will fail.

Statistical independence between two variables $x_1(t)$ and $x_2(t)$ is defined as:

$$p(x_1(t))p(x_2(t))=p(x_1(t),x_2(t)) \forall t \qquad (46)$$

where $p(x_1(t))$ is the marginal probability density function of $x_1(t)$ and $p(x_1(t),x_2(t))$ is the joint probability density function ($x_1(t)=u_i(t-d_j)$ and $x_2=y(t)$); that is, the product of the marginal probabilities is equal to the joint probability. If they are equal, this constitutes statistical independence, and the level of inequality provides a measure of statistical dependence.

Any measure $f(x_1(t),x_2(t))$ which has the following property ("Property 1") is a suitable measure of statistical dependence:

Property 1: $f(x_1(t),x_2(t))$ is 0 if and only if Equation 46 holds at each data point, and f>0 otherwise. In addition, the magnitude of f measures the degree of violation of Equation 46 summed over all data points.

Mutual information (MI) is one such measure, and is defined as:

$$MI = \sum_t p(x_1(t), x_2(t)) \log\left(\frac{p(x_1(t), x_2(t))}{p(x_1(t))p(x_2(t))}\right) \qquad (47)$$

Property 1 holds for MI. Theoretically, there is no fixed maximum value of MI, as it depends upon the distributions of the variables in question. As explained hereinbelow, the maximum, as a practical matter, also depends upon the method employed to estimate probabilities. Regardless, MI values for different pairs of variables may be ranked by relative magnitude to determine the relative strength of the relationship between each pair of variables. Any other measure f having Property 1 would be equally applicable, such as the sum of the squares of the product of the two sides of Equation 58:

$$SSD = \sum_t [(p(x_1(t), x_2(t)) - p(x_1(t))p(x_2(t)))]^2 \qquad (48)$$

However, MI (Equation 47) is the preferred method in the disclosed embodiment.

Statistical Dependence vs. Correlation

For purposes of the present invention, the method described above, i.e., measuring statistical dependence, is superior to using linear correlation. The definition of linear correlation is well-known and is not stated herein. Correlation ranges in value from −1 to 1, and its magnitude indicates the degree of linear relationship between variables $x_1(t)$ and $x_2(t)$. Nonlinear relationships are not detected by correlation. For example, y(t) is totally determined by x(t) in the relation $$y(t)=x^2(t). \qquad (49)$$

Yet, if x(t) varies symmetrically about zero, then:

$$\text{corr}(y(t),x(t))=0. \qquad (50)$$

That is, correlation detects no linear relationship because the relationship is entirely nonlinear. Conversely, statistical dependence registers a relationship of any kind, linear or nonlinear, between variables. In this example, MI(y(t),x(t)) would calculate to be a large number.

Estimation Probabilities

An issue in computing MI is how to estimate the probability distributions given a dataset D. Possible methods include kernel estimation methods, and binning methods.

The preferred method is a binning method, as binning methods are significantly cheaper to compute than kernel estimation methods.

Of the binning techniques, a very popular method is that disclosed in A. M. Fraser and Harry L. Swinney. "Independent Coordinates for Strange Attractors in Mutual Information," *Physical Review A,* 33(2): 1134–1140, 1986. This method makes use of a recursive quadrant-division process.

The present method uses a binning method whose performance is highly superior to that of the Fraser method. The binning method used herein simply divides each of the two dimensions ($u_i(t-d_j)$ and y(t)) into a fixed number of divisions, where N is a parameter which may be supplied by the user, or which defaults to sqrt(#datapoints/20). The width of each division is variable, such that an (approximately) equal number of points fall into each division of the dimension. Thus, the process of dividing each dimension is independent of the other dimension.

In order to implement the binning procedure, it is first necessary to define a grid of data points for each input value at a given delay. Each input value will be represented by a time series and will therefore be a series of values. For example, if the input value were $u_1(t)$, there would be a time series of these $u_1(t)$ values, $u_1(t_1)$, $u_1(t_2)$ . . . $u_1(t_f)$. There would be a time series $u_1(t)$ for each output value y(t). For the purposes of the illustration herein, there will be considered only a single output from y(t), although it should be understood that a multiple input, multiple output system could be utilized.

Figure 25:
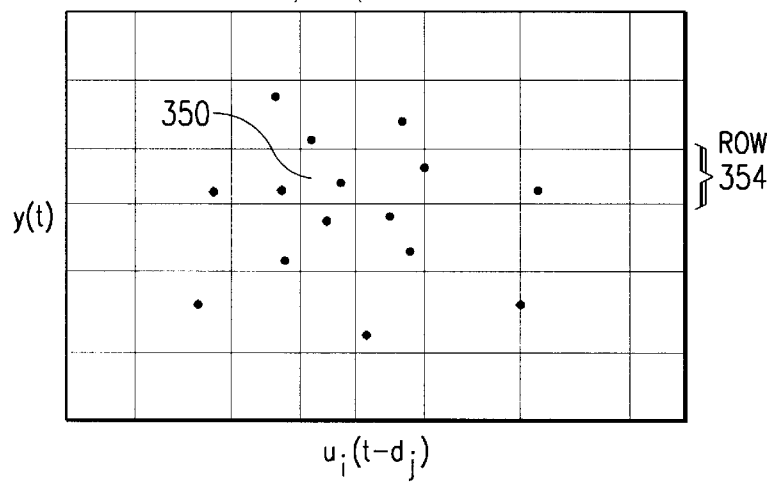
FIG. 25 illustrates a diagrammatic view of the binning method for determining statistical independence.

Referring now to FIG. 25, there is illustrated a diagrammatic view of a binning method. In this method, a single point generated for each value of $u_i(t)$ for the single value y(t). All of the data in the time series $u_i(t)$ is plotted in a single grid. This time series is then delayed by the delay value $d_j$ to provide a delay value $u_i(t-d_j)$. For each value of j from $d_{j,min}$ to $d_{j,max}$, there will be a grid generated. There will then be a mutual information value generated for each grid to show the strength of the relationship between that particular delay value $d_j$ and the output y(t). By continually changing the delay $d_j$ for the time series $u_i(t)$, a different MI value can be generated.

In the illustration of FIG. 25, there are illustrated a plurality of rows and a plurality columns with the data points disposed therein with the x-axis labeled $u_i(t-d_j)$ and the y-axis labeled y(t). For a given column 352 and a given row 354, there is defined a single bin 350. As described above, the grid lines are variable such that the number of points in any one division is variable, as described hereinabove. Once the grid is populated, then it is necessary to determine the MI value. This MI value for the binning grid or a given value of $d_j$ is defined as follows:

$$MI = \sum_{i=1}^{N} \sum_{j=1}^{M} p(x_i(i), x_2(j)) \log \frac{p(x_i(i), x_2(j))}{p(x_i(i))p(x_2(j))} \qquad (51)$$

where $p(x_1(i),x_2(j))$ is equal to the number of points in a particular bin over the total number of points in the grid, $p(x_1(i))$ is equal to the number of points in a column over the total number of points and $p(x_2(j))$ is equal to the number of data points in a row over the total number of data points in the grid and n is equal to the number of rows and M is equal to the number of columns. Therefore, it can be seen that if the data was equally distributed around the grid, the value of MI would be equal to zero. As the strength of the relationship increases as a function of the delay value, then it would be noted that the points tend to come together in a strong relationship, and the value of MI increases. The delay $d_j$ having the strongest relationship will therefore be selected as the proper delay for that given $u_i(t)$.

Figure 26:
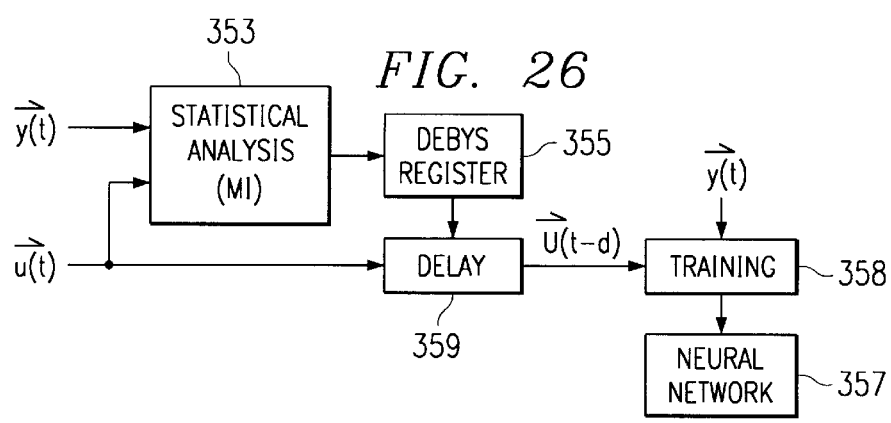
FIG. 26 illustrates a block diagram of a training method wherein delay is determined by statistical analysis.

Referring now to FIG. 26, there is illustrated a block diagram depicting the use of the statistical analysis approach. The statistical analysis is defined in a block 353 which receive both the values of y(t) and u(t). This statistical analysis is utilized to select for each $u_i(t)$ the appropriate delay $d_j$. This, of course, is for each y(t). The output of this is stored in a delay register 355. During training of a non-linear neural network 357, a delay block 359 is provided for selecting from the data set of u(t) for given $u_i(t)$ an appropriate delay and introducing that delay into the value before inputting it to a training block 358 for training the neural network 357. The training block 358 also utilizes the data set for y(t) as target data. Again, the particular delay for the purpose of training is defined by statistical analysis block 353, in accordance with the algorithms described hereinabove.

Figure 27:
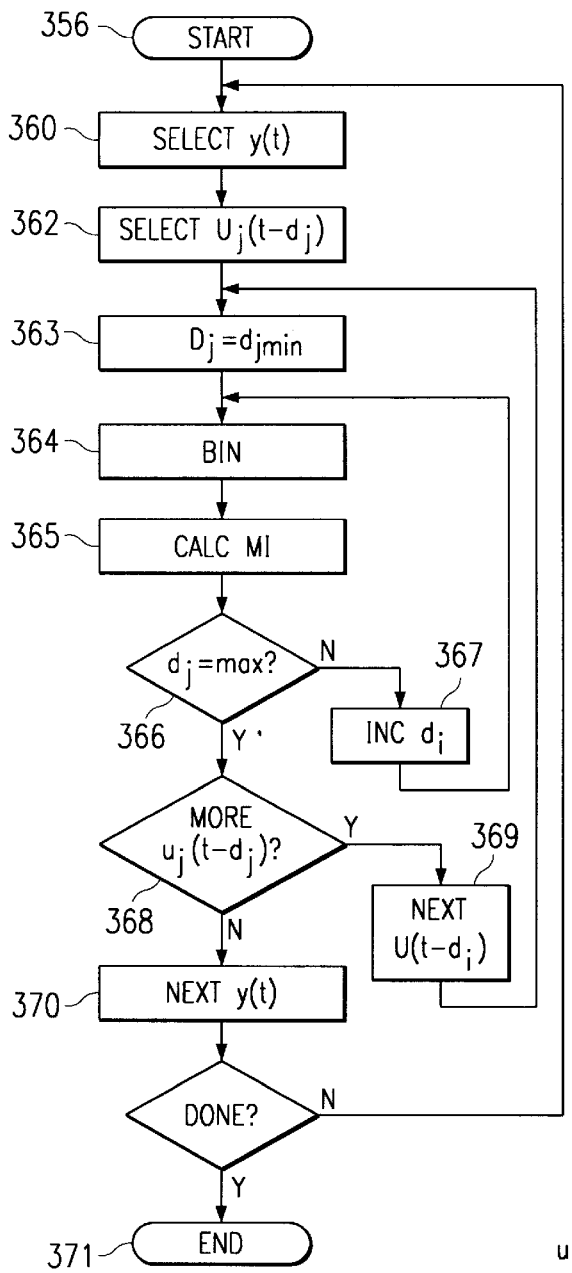
FIG. 27 illustrates a flow chart of the method for determining delays based upon statistical methods.

Referring now to FIG. 27, there is illustrated a flow chart depicting the binning operation. The procedure is initiated at a block 356 and proceeds to a block 360 to select a given one of the outputs y(t) for a multi-output system and then to a block 362 to select one of the input values $u_i(t-d_j)$. It then flows to a function block 363 to set the value of $d_j$ to the minimum value and then to a block 364 to perform the binning operation wherein all the points for that particular delay $d_j$ are placed onto the grid. The MI value is then calculated for this grid, as indicated by a block 365. The program then proceeds to a decision block 366 to determine if the value of $d_j$ is equal to the maximum value $d_{j,max}$. If not, this value is incremented by a block 367 and then proceeds back to the input of block 364 to increment the next delay value for $u_i(t-d_j)$. This continues until the delay has varied from $d_{j,min}$ through $d_{j,max}$. The program then flows to the decision block 368 to determine if there are additional input variables. If so, the program flows to a block 369 to select the next variable and then back to the input of block 363. If not, the program flows to a block 370 to select the next value of y(t). This will then flow back to the input of function block 360 until all input variables and output variables have been processed. The program will then flow to an END block 371.

Identification of Steady-State Models Using Gain Constraints:

In most processes, bounds upon the steady-state gain are known either from the first principles or from practical experience. Once it is assumed that the gain information is known, a method for utilizing this knowledge of empirically-based models will be described herein. If one considers a parameterized quasi-steady-state model of the form:

$$\bar{y}(t) = \bar{N}(w, \bar{u}(t-d)) \quad (52)$$

where w is a vector of free parameters (typically referred to as the weights of a neural network) and N(w,u(t-d)) represents a continuous function of both w and u(t-d). A feedforward neural network as described hereinabove represents an example of the nonlinear function. A common technique for identifying the free parameters w is to establish some type of cost function and then minimize this cost function using a variety of different optimization techniques, including such techniques as steepest descent or conjugate gradients. As an example, during training of feedforward neural networks utilizing a backpropagation algorithm, it is common to minimize the mean squared error over a training set, $$J(\vec{w}) = \sum_{t=1}^{P} (\vec{y}(t) - \vec{y}_d(t))^2 \quad (53)$$

where P is the number of training patterns, $y_d(t)$ is the training data or target data, y(t) is the predicted output and J(w) is the error.

Constraints upon the gains of steady-state models may be taken into account in determining w by modifying the optimization problem. As noted above, w is determined by establishing a cost function and then utilizing an optimization technique to minimize the cost function. Gain constraints may be introduced into the problem by specifying them as part of the optimization problem. Thus, the optimization problem may be reformulated as:

$$\min(J(\vec{w})) \quad (54)$$

subject to $$G_l(\vec{u}(1)) < G(\vec{u}(1)) < G_h(\vec{u}(1)) \quad (55)$$

$$G_l(\vec{u}(2)) < G(\vec{u}(2)) < G_h(\vec{u}(2)) \quad (56)$$

$$\vdots \quad (57)$$

$$G_l(\vec{u}(P)) < G(u(P)) < G_h(\vec{u}(P)) \quad (58)$$

where $G_l(u(t))$ is the matrix of the user-specified lower gain constraints and $G_h(u(t))$ are the upper gain constraints. Each of the gain constraints represents the enforcement of a lower and upper gain on a single one of the input-output pairs of the training set, i.e., the gain is bounded for each input-output pair and can have a different value. These are what are referred to as "hard constraints." This optimization problem may be solved utilizing a non-linear programming technique.

Another approach to adding the constraints to the optimization problem is to modify the cost function, i.e., utilize some type of soft constraints. For example, the squared error cost function of Equation 53 may be modified to account for the gain constraints in the gain as follows:

$$J(w) = \sum_{t=1}^{P} (\vec{y}(t) - \vec{y}_d(t))^2 + \lambda \sum_{t=1}^{P} (H(G_l(\vec{u}(t)) - G(\vec{u}(t))) + H(G(\vec{u}(t)) - G_h(\vec{u}(t)))) \quad (59)$$

where H(.) represents a non-negative penalty function for violating the constraints and $\lambda$ is a user-specified parameter for weighting the penalty. For large values of $\lambda$, the resulting model will observe the constraints upon the gain. In addition, extra data points which are utilized only in the second part of the cost function may be added to the historical data set to effectively fill voids in the input space. By adding these additional points, proper gain extrapolation or interpolation can be guaranteed. In the preferred embodiment, the gain constraints are held constant over the entire input space.

By modifying the optimization problem with the gain constraints, models that observe gain constraints can be effectively trained. By guaranteeing the proper gain, users will have greater confidence that an optimization and control system based upon such a model will work properly under all conditions.

One prior art example of guaranteeing global positive or negative gain (monotonicity) in a neural network is described in J. Sill & Y. S. Abu-Mostafa, "Monotonicity Hints," Neural Information Processing Systems, 1996. The technique disclosed in this reference relies on adding an additional term to the cost function. However, this approach can only be utilized to bound the gain to be globally positive or negative and is not used to globally bound the range of the gain, nor is it utilized to locally bound the gain (depending on the value of u(t)).

Identification of SS Model with Dynamic Data

Figure 28:
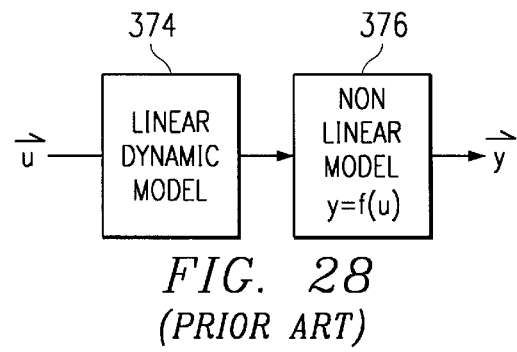
FIG. 28 illustrates a prior art Weiner model.

Referring now to FIG. 28, there is illustrated a block diagram of a prior art Weiner model, described in M. A. Henson and D. F. Seborg, "Nonlinear Process Control," Prentice Hall PTR, 1997, Chapter 2, pp 11–110. In the Weiner model, a non-linear model 376 is generated. This non-linear model is a steady-state model. This steady-state model may be trained on input data u(t) to provide the function y(t)=f(u(t)) such that this is a general non-linear model. However, the input u(t) is processed through a linear dynamic model 374 of the system, which linear dynamic model 374 has associated therewith the dynamics of the system. This provides on the output thereof a filtered output $\bar{u}(t)$ which has the dynamics of the system impressed thereupon. This constitutes the input to the non-linear model 376 to provide on the output a prediction y(t).

Figure 29:
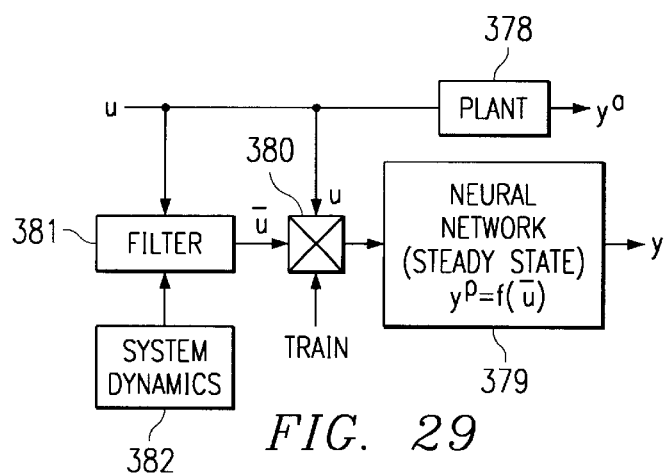
FIG. 29 illustrates a block diagram of a training method utilizing the system dynamics.

Referring now to FIG. 29, there is illustrated a block diagram of the training method of the present invention. A plant 378 is provided which can represent any type of system to be modeled, such as a boiler or a chemical process. There are various inputs provided to the plant in the form of u(t). This will provide an actual output $y^a(t)$. Although not illustrated, the plant has a number of measurable state variables which constitute the output of various sensors such as flow meters, temperature sensors, etc. These can provide data that is utilized for various training operations, these state outputs not illustrated, it being understood that the outputs from these devices can be a part of the input training data set.

A steady-state neural network 379 is provided which is a non-linear network that is trained to represent the plant. A neural network typically contains an input layer and an output layer and one or more hidden layers. The hidden layers provide the mapping for the input layers to the output layers and provide storage for the stored representation of the plant. As noted hereinabove, with a sufficient amount of steady-state data, an accurate steady-state model can be obtained. However, in a situation wherein there is very little steady-state data available, the accuracy of a steady-state model with conventional training techniques is questionable. As will be described in more detail hereinbelow, the training method of the present invention allows training of the neural network 374, or any other empirical modeling method to learn the steady-state process model from data that has no steady-state behavior, i.e., there is a significant dynamic component to all training data.

Typically, a plant during operation thereof will generate historical data. This historical data is collected and utilized to later train a network. If there is little steady-state behavior exhibited in the input data, the present invention allows for training of the steady-state model. The input data u(t) is input to a filter 381 which is operable to impress upon the input data the dynamics of the plant 378 and the training data set. This provides a filtered output $u^f(t)$ which is input to a switch 380 for input to the plant 378. The switch 380 is operable to input the unfiltered input data u(t) during operation of the plant, or the filtered input data $u^f(t)$ during training into the neural network 379. As will be described hereinbelow, the u(t) input data, prior to being filtered, is generated as a separate set of dynamic training data by a step process which comprises collecting step data in a local region. The filter 381 has associated therewith a set of system dynamics in a block 382 which allows the filter 381 to impress the dynamics of the system onto the input training data set. Therefore, during training of the neural network 379, the filtered data $\bar{u}(t)$ is utilized to train the network such that the neural network 379 provides an output y(t) which is a function of the filtered data $\bar{u}(t)$ or:

$$\bar{y}^p(t)=f(\bar{u}^f(t)) \qquad (60)$$

Figure 30:
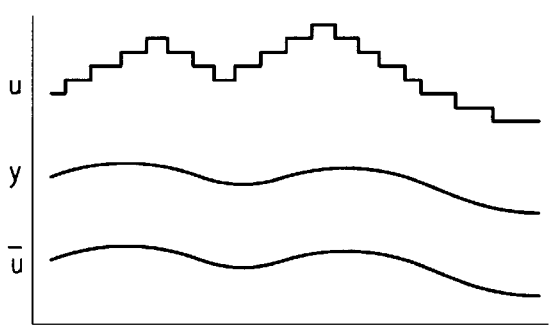
FIG. 30 illustrates plots of input data, actual output data, and the filtered input data which has the plant dynamics impressed thereupon.

Referring now to FIG. 30, there is illustrated a diagrammatic view of the training data and the output data. The training data is the actual set of training data which comprises the historical data. This is the u(t) data which can be seen to vary from point to point. The problem with some input data in a training set of data, if not all data, is that it changes from one point to another and, before the system has "settled," it will change again. That is, the average time between movements in u(t) is smaller than $T_{ss}$, where $T_{ss}$ is the time for y(t) to reach steady-state. As such, the corresponding output data y(t) will constitute dynamic data or will have a large dynamic component associated therewith. In general, the presence of this dynamic information in the output data must be accounted for to successfully remove the dynamic component of the data and retain the steady-state component of the steady-state neural network 379.

As will be described in more detail hereinbelow, the present invention utilizes a technique whereby the actual dynamics of the system which are inherent in the output data y(t) are impressed upon the input data u(t) to provide filtered input data $\bar{u}(t)$. This data is scaled to have a gain of one, and the steady-state model is then trained upon this filtered data. As will also be described in more detail hereinbelow, the use of this filtered data essentially removes the dynamic component from the data with only the steady-state component remaining. Therefore, a steady-state model can be generated.

Figure 31:
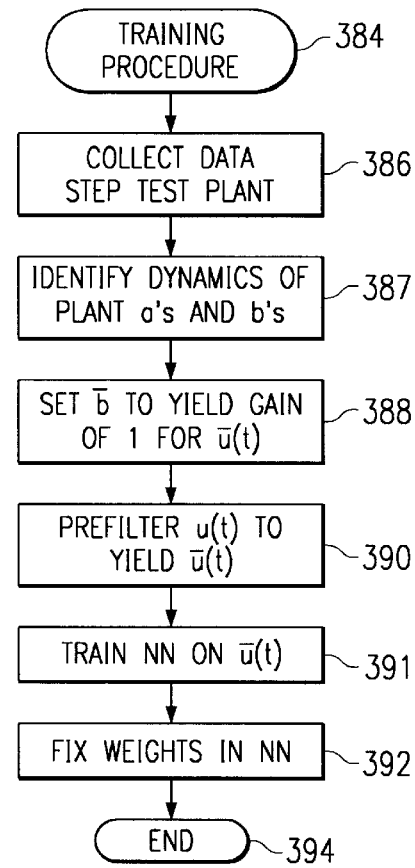
FIG. 31 illustrates a flow chart for the training operation.

Referring now to FIG. 31, there is illustrated a flow chart depicting the training procedure for the neural network 379 of FIG. 29 for a single output. As noted above, the neural network is a conventional neural network comprised of an input layer for receiving a plurality of input vectors, an output layer for providing select predicted outputs, and one or more hidden layers which are operable to map the input layer to the output layer through a stored representation of the plant 378. This is a non-linear network and it is trained utilizing a training data set of input values and target output values. This is, as described hereinabove, an iterative procedure utilizing algorithms such as the backpropagation training technique. Typically, an input value is input to the network during the training procedure, and also target data is provided on the output. The results of processing the input data through the network are compared to the target data, and then an error generated. This error, with the backpropagation technique, is then back propagated through the network from the output to the input to adjust the weights therein, and then the input data then again processed through the network and the output compared with the target data to generate a new error and then the algorithm readjusts the weights until they are reduced to an acceptable level. This can then be used for all of the training data with multiple passes required to minimize the error to an acceptable level, resulting in a trained network that provides therein a stored representation of the plant.

As noted above, one of the disadvantages to conventional training methods is that the network 379 is trained on the set of historical input data that can be incomplete, or have some error associated therewith. The incompleteness of the historical data may result in areas in the input space on which the network is not trained. The network, however, will extrapolate its training data set during the training operation, and actually provide a stored representation within that portion of the input space in which data did not exist. As such, whenever input data is input to the network in an area of the input space in which historical input data did not exist during training, the network will provide a predicted output value. This, however, effectively decreases the confidence level in the result in this region. Of course, whenever input data is input to the network in a region that was heavily populated with input data, the confidence level is relatively high.

Another source of error, as noted hereinabove, is the dynamic component of the data. If the historical data that forms the training data set is dynamic in nature, i.e., it is changing in such a manner that the output never settles down to a steady-state value, this can create some errors when utilizing this data for training. The reason for this is that the fundamental assumption in training a steady-state neural network with an input training data set is that the data is steady-state data. The training procedure of the present invention removes this error.

Referring further to FIG. 31, the flow chart is initiated at a block 384 and then proceeds to a block 386 wherein dynamic data for the system is collected. In the preferred embodiment, this is in the form of step test data wherein the input is stepped between an initial value and a final value multiple times and output data taken from the plant under these conditions. This output data will be rich in dynamic content for a local region of the input space. An alternative method is to examine the historical data taken during the operation of the plant and examine the data for movements in the manipulated variables (MVs) or the dynamic variables (DVs). These variables are then utilized for the purpose of identifying the dynamic model. However, the preferred model is to utilize a known input that will result in the dynamic change in the output. Of course, if there are no dynamics present in the output, then this will merely appear as a steady-state value, and the dynamic model will have filter values of a=0 and b=0. This will be described hereinbelow.

The step test data, as will be described hereinbelow, is data that is taken about a relatively small region of the input space. This is due to the fact that the variables are only manipulated between two values, and initial steady-state value and a final value, in a certain region of the input space, and the data is not taken over many areas of the input space. Therefore, any training set generated will represent only a small portion of the input space. This will be described in more detail hereinbelow. It should be noted that these dynamics in this relatively small region of the input space will be utilized to represent the dynamics over the entire input space. A fundamental presumption is that the dynamics at any given region remain substantially constant over the entire input space with the exception of the dynamic gain varying.

Once the dynamic data has been collected for the purpose of training, this dynamic training data set is utilized to identify the dynamic model of the system. If, of course, a complete steady-state data set were available, there would be a reduced need for the present invention, although it could be utilized for the purpose of identifying the dynamics of the system. The flow chart then proceeds to a block 387 wherein the dynamics of the plant are identified. In essence, a conventional model identification technique is utilized which models the dynamics of the plant. This is a linear model which is defined by the following equation:

$$y(t) = -a_1 y(t-1) - a_2(t-2) + b_1 u(t) + b_2 u(t-1) \tag{61}$$

In the above-noted model of Equation 61, the values of $a_1$, $a_2$, $b_1$ and $b_2$ define the parameters of the model and are defined by training this model. This operation will be described in detail hereinbelow; however, once trained, this model will define the dynamic model of the plant 378 as defined by the dynamics associated with the dynamic training data set at the location in the input space at which the data was taken. This will, of course, have associated therewith a dynamic gain, which dynamic gain will change at different areas in the input space.

Once the dynamic model has been identified utilizing the dynamic training data set, i.e., the a's and b's of the model have been determined, the program will flow to a function block 388 to determine the properties of a dynamic pre-filter model, which is operable to process the input values u(t) through the dynamic model to provide a filtered output $u^f(t)$ on the output which is, in effect, referred to as a "filtered" input in accordance with the following equation:

$$\bar{u}^f(t) = a_1 \bar{u}(t-1) - a_2 \bar{u}(t-1) + \bar{b}_1 u(t) + \bar{b}_2 u(t-1) \tag{62}$$

wherein the values of $a_1$ and $a_2$ are the same as in the dynamic model of the plant, and the values of $\bar{b}_1$ and $\bar{b}_2$ are adjusted to set the gain to a value of zero.

The pre-filter operation is scaled such that the gain of the dynamic model utilized for the pre-filter operation is set equal to unity. The b-values are adjusted to provide this gain scaling operation. The gain is scaled in accordance with the following:

$$\text{gain} = 1 = \frac{\bar{b}_1 + \bar{b}_2}{1 + a_1 + a_2} \tag{63}$$

If the gain were not scaled, this would require some adjustment to the steady-state model after training of the steady-state model. For example, if the gain of the model were equal to "two," this would require that the steady-state model have a gain adjustment of "one-half" after training.

After the filter values have been determined, i.e., the $\bar{b}$-values with the gain set equal to one, then the input values u(t) for the historical data are processed through the pre-filter with the gain set equal to one to yield the value of $\bar{u}(t)$, as indicated by a function block 390. At this point, the dynamics of the system are now impressed upon the historical input data set, i.e., the steady-state component has been removed from the input values. These input values $\bar{u}(t)$ are now input to the neural network in a training operation wherein the neural network 378 is trained upon the filtered input values over the entire input space (or whatever portion is covered by the historical data). This data $\bar{u}(t)$ has the dynamics of the system impressed thereupon, as indicated by block 391. The significance of this is that the dynamics of the system have now been impressed upon the historical input data and thus removed from the output such that the only thing remaining is the steady-state component. Therefore, when the neural network 378 is trained on the filtered output, the steady-state values are all that remain, and a valid steady-state model is achieved for the neural network 378. This steady-state neural network is achieved utilizing data that has very little steady-state nature. Once trained, the weights of the neural network are then fixed, as indicated by a function block 392, and then the program proceeds to an END block 394.

Figure 32:
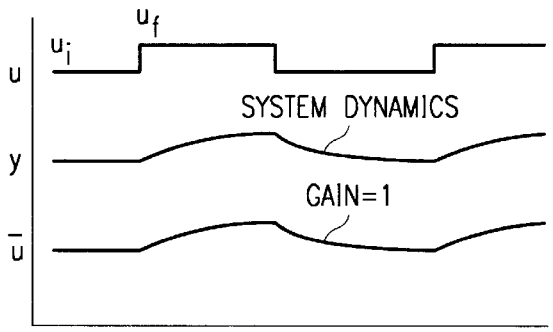
FIG. 32 illustrates a diagrammatic view of the step test.

Referring now to FIG. 32, there is illustrated a diagrammatic view of the step test. The input values u(t) are subjected to a step response such that they go from an initial steady-state value $u_i(t)$ to a final value $u_f(t)$. This results in a response on the output y(t), which is rich in dynamic content. The step test is performed such that the value of u(t) is increased from $u_i(t)$ to $u_f(t)$, and then decreased back to $u_i(t)$, preferably before the steady-state value has been reached. The dynamic model can then be identified utilizing the values of u(t) presented to the system in the step test and the output values of y(t), these representing the dynamic training data set. This information is utilized to identify the model, and then the model utilized to obtain the pre-filtered values of $\bar{u}(t)$ by passing the historical input data u(t) through the identified model with the dynamic gain of the model set equal to one. Again, as noted above, the values of $\bar{b}$ are adjusted in the model such that the gain is set equal to one.

Figure 33:
FIG. 33 illustrates a diagrammatic view of a single step for u(t) and $\bar{u}(t)$.

Referring now to FIG. 33, there is illustrated a diagrammatic view of the relationship between the u(t) and the $\bar{u}(t)$, indicating that the gain is set equal to one. By setting the gain equal to one, then only the dynamics determined at the "training region" will be impressed upon the historical input data which exists over the entire input space. If the assumption is true that the only difference between the dynamics between given regions and the input space is the dynamic gain, then by setting the gain equal to one, the dynamics at the given region will be true for every other region in the input space.

Figure 34:
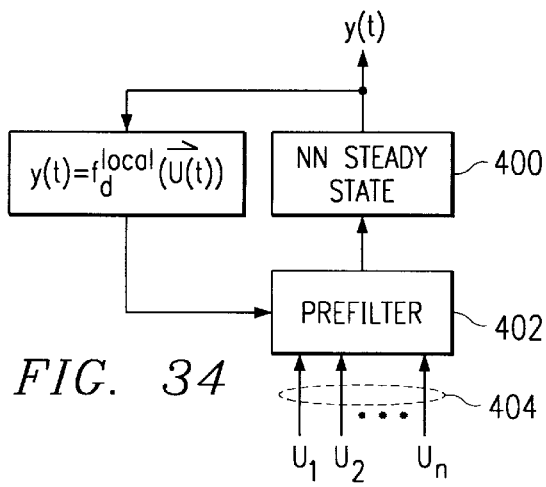
FIG. 34 illustrates a diagrammatic view of the pre-filter operation during training.

Referring now to FIG. 34, there is illustrated a block diagram of the system for training a given output. The training system for the invention described herein with respect to impressing the dynamics of the plant onto the historical input data basically operates on a single output. Most networks have multiple inputs and multiple outputs and are referred to as MIMO (multi-input, multi-output) networks. However, each output will have specific dynamics that are a function of the inputs. Therefore, each output must have a specific dynamic model which defines the dynamics of that output as a function of the input data. Therefore, for a given neural network 400, a unique pre-filter 402, will be required which receives the input data on the plurality of input lines 404. This pre-filter is operable to incorporate a dynamic model of the output y(t) on the input u(t). This will be defined as the function:

This represents the dynamic relationship between the inputs and a single output with the gain set equal to unity.

$$y(t) = f_d^{local}(\bar{u}(t)) \quad (64)$$

Figure 35:
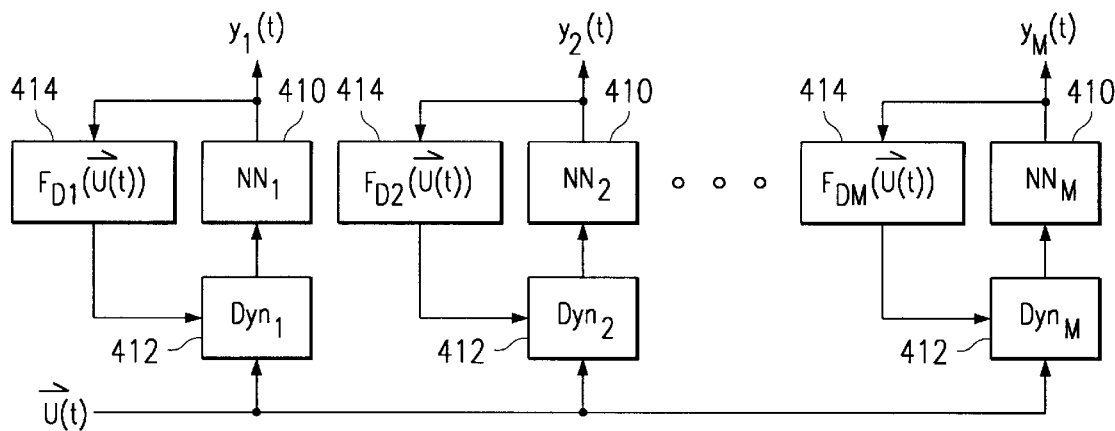
FIG. 35 illustrates a diagrammatic view of a MIMO implementation of the training method of the present invention.

Referring now to FIG. 35, there is illustrated a dynamic representation of a MIMO network being modeled. In a MIMO network, there will be required a plurality of steady-state neural networks 410, labeled $NN_1$, $NN_2$, ... $NN_M$. Each one is associated with a separate output $y_1(t)$, $y_2(t)$, ... $y_M(t)$. For each of the neural networks 410, there will be a pre-filter or dynamic model 412 labeled $Dyn_1$, $Dyn_2$ ... $Dyn_M$. Each of these models 412 receives on the input thereof the input values u(t), which constitutes all of the inputs $u_1(t)$, $u_2(t)$, ... $u_n(t)$. For each of the neural networks 410, during the training operation, there will also be provided the dynamic relationship between the output and the input u(t) in a block 14. This dynamic relationship represents only the dynamic relationship between the associated one of the outputs $y_1(t)$, $y_2(t)$, ... $y_M(t)$. Therefore, each of these neural networks 410 can be trained for the given output.

Figure 36:
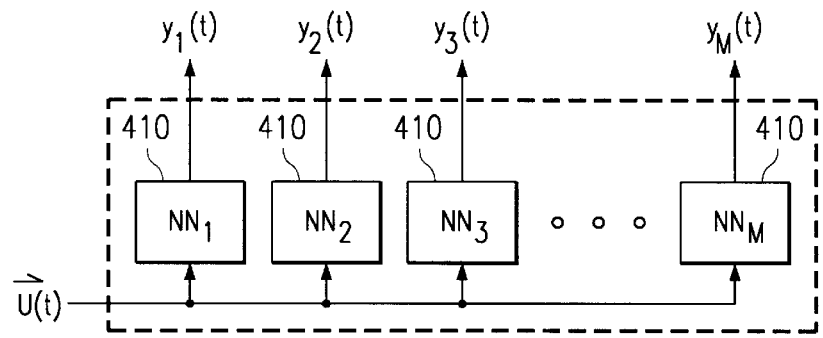
FIG. 36 illustrates a non-fully connected network.

Referring now to FIG. 36, there is illustrated the block diagram of the predicted network after training. In this mode, all of the neural networks 410 will now be trained utilizing the above-noted method of FIG. 30, and they will be combined such that the input vector u(t) will be input to each of the neural networks 410 with the output of each of the neural networks comprising one of the outputs $y_1(t)$, $y_2(t)$, ... $y_M(t)$.

Graphical Interface for Model Identification

Figure 37:
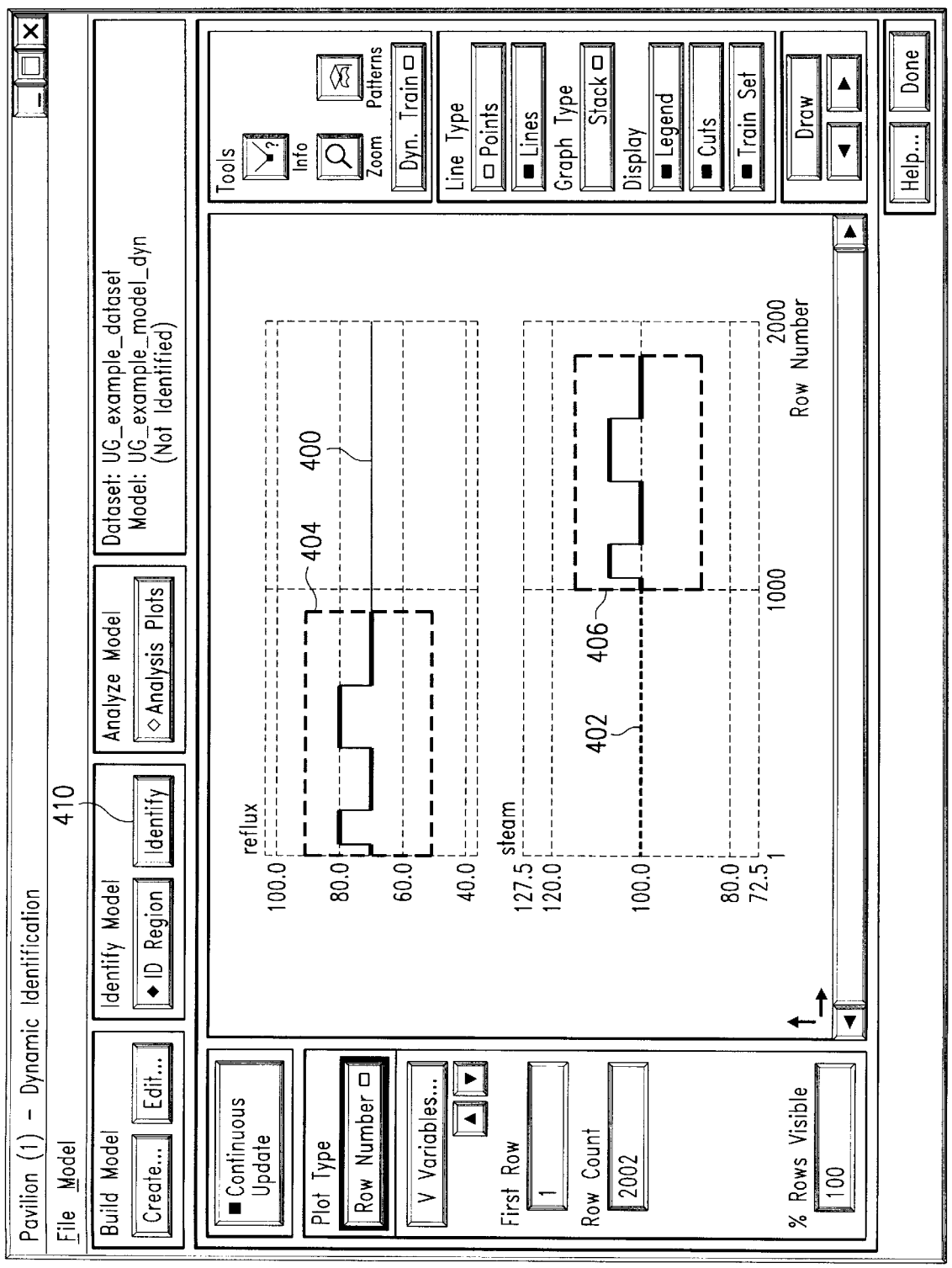
FIG. 37 illustrates a graphical user interface for selecting ranges of values for the dynamic inputs in order to train the dynamic model.
Figure 39:
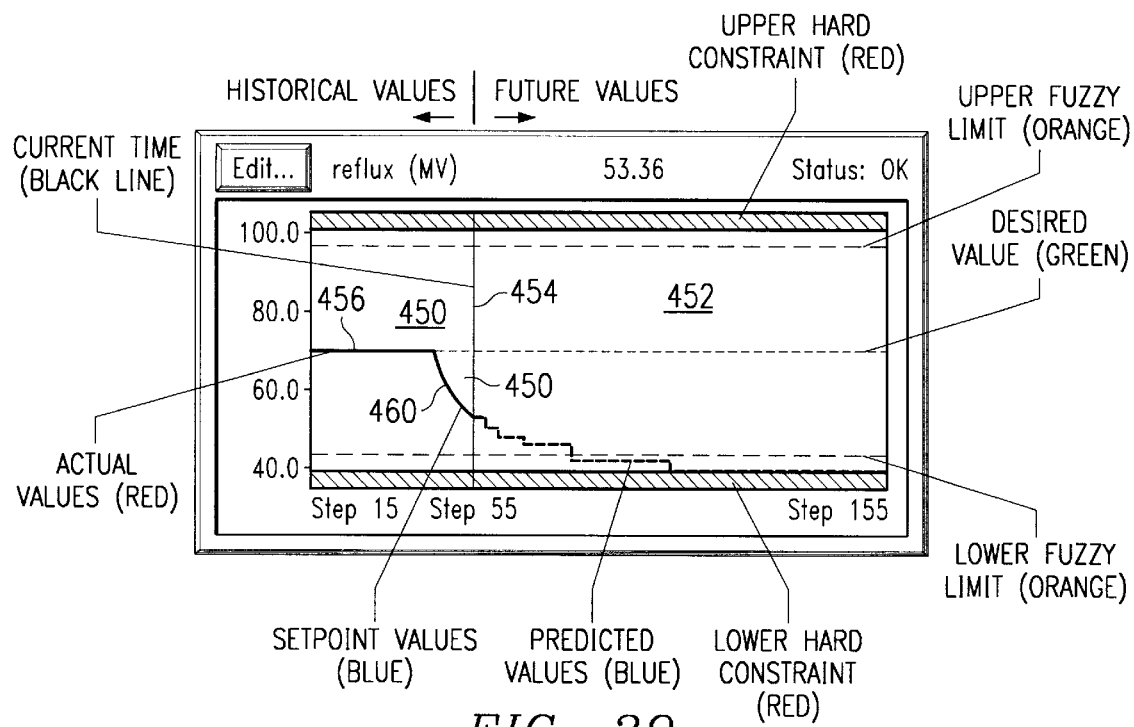
FIGS. 39 and 40 illustrate graphical user interfaces for depicting both the actual historical response and the predictive response.

Referring now to FIG. 37, there is illustrated a graphical user interface (GUI) for allowing the user to manipulate data on the screen, which manipulated data then defines the parameters of the model identification procedure. In FIG. 39 there are illustrated two input values, one labeled "reflux" and one labeled "steam." The reflux data is represented by a curve 400 whereas the steam data is represented by curve 402. These curves constitute dynamic step data which would have corresponding responses on the various outputs (not shown). As noted hereinabove with respect to FIG. 34, the output would have a dynamic response as a result of the step response of the input.

The user is presented the input data taken as a result of the step test on the plant and then allowed to identify the model from this data. The user is provided a mouse or similar pointing device (not shown) to allow a portion of one or more of the data values to be selected over a user defined range. In FIG. 37, there is illustrated a box 404 in phantom about a portion of the input reflux data which is generated by the user with the pointing device. There is also illustrated a box 406 in phantom about a portion of the steam data on curve 402. The portion of each of the curves 400 and 402 that is enclosed within the respective boxes 404 and 406 is illustrated in thick lines as "selected" data. As noted hereinabove, the step test data is taken in a particular localized portion of the input space, wherein the input space is defined by the various input values in the range over which the data extends. By allowing the user the versatility of selecting which input data is to be utilized for the purpose of identifying the model, the user is now permitted the ability to manipulate the input space. Once the user has selected the data that is to be utilized and the range of data, the user then selects a graphical button 410 which will then perform an "identify" operation of the dynamic model utilizing the selected information.

Figure 38:
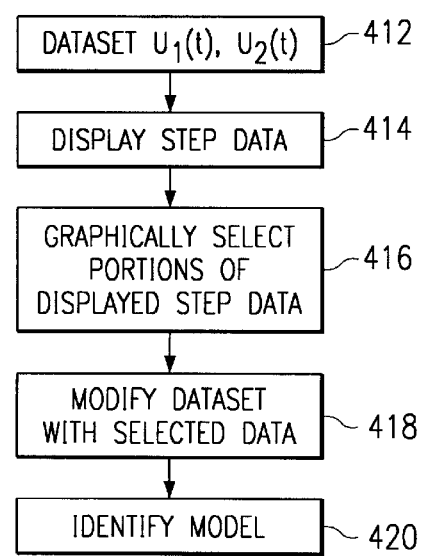
FIG. 38 illustrates a flowchart depicting the selection of data and training of the model.

Referring now to FIG. 38, there is illustrated a flowchart depicting the general identify operation described above with respect to FIG. 39. The program is initiated at a function block 412 which indicates a given data set, which data set contains the step test data for each input and each output. The program then flows to a function block 414 to display the step test data and then to a function block 416 to depict the operation of FIG. 38 wherein the user graphically selects portions of the display step test data. The program then flows to a function block 418 wherein the data set is modified with the selected step test data. It is necessary to modify the data set prior to performing the identification operation, as the identification operation utilizes the available data set. Therefore, the original data set will be modified to only utilize the selected data, i.e., to provide a modified data set for identification purposes. The program will then flow to a function block 420 wherein the model will be identified utilizing the modified data set.

Referring now to FIG. 39, there is illustrated a second type of graphical interface. After a model has been created and identified, it is then desirable to implement the model in a control environment to control the plant by generating new input variables to change the operation of the plant for the purpose of providing a new and desired output. However, prior to placing the model in a "run-time" mode, it may be desirable to run a simulation on the model prior to actually incorporating it into the run time mode. Additionally, it may be desirable to graphically view the system when running to determine how the plant is operating in view of what the predicted operation is and how that operation will go forward in the future.

Figure 40:
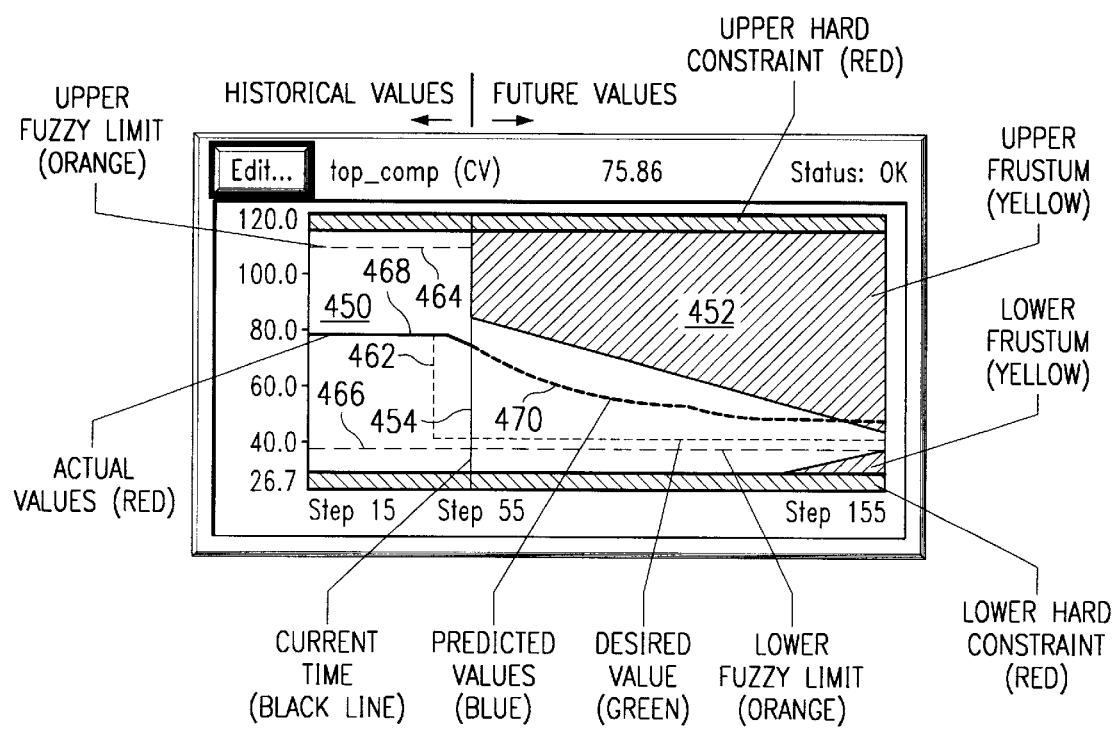

Referring further to FIG. 40, there is illustrated a plot of a single manipulatable variable (MV) labeled "reflux." The plot illustrates two sections, a historical section 450 and a predictive section 452. There is illustrated a current time line 454 which represents the actual value at that time. The x-axis is comprised of the steps and horizontal axis illustrates the values for the MV. In this example of FIG. 41, the system was initially disposed at a value of approximately 70.0. In historical section 450, a bold line 456 illustrates the actual values of the system. These actual values can be obtained in two ways. In a simulation mode, use the actual values that are input to the simulation model. In the run-time mode, they are the set point values input to the plant.

In a dynamic system, any change in the input will be made in a certain manner, as described hereinabove. It could be a step response or it could have a defined trajectory. In the example of FIG. 40, the change in the MV is defined along a desired trajectory 458 wherein the actual values are defined along a trajectory 460. The trajectory 458 is defined as the "set point" values. In a plant, the actual trajectory may not track the setpoints (desired MVs) due to physical limitations of the input device, time constraints, etc. In the simulation mode, these are the same curve. It can be seen that the trajectory 460 continues up to the current time line 454. After the current time line 454, there is provided a predicted trajectory which will show how it is expected the plant will act and how the predictive model will predict. It is also noteworthy that the first value of the predicted trajectory is the actual input to the plant. The trajectory for the MV is computed every iteration using the previously described controller. The user therefore has the ability to view not only the actual response of the MV from a historical standpoint but, also the user can determine what the future prediction will be a number of steps into the future.

Figure 41:
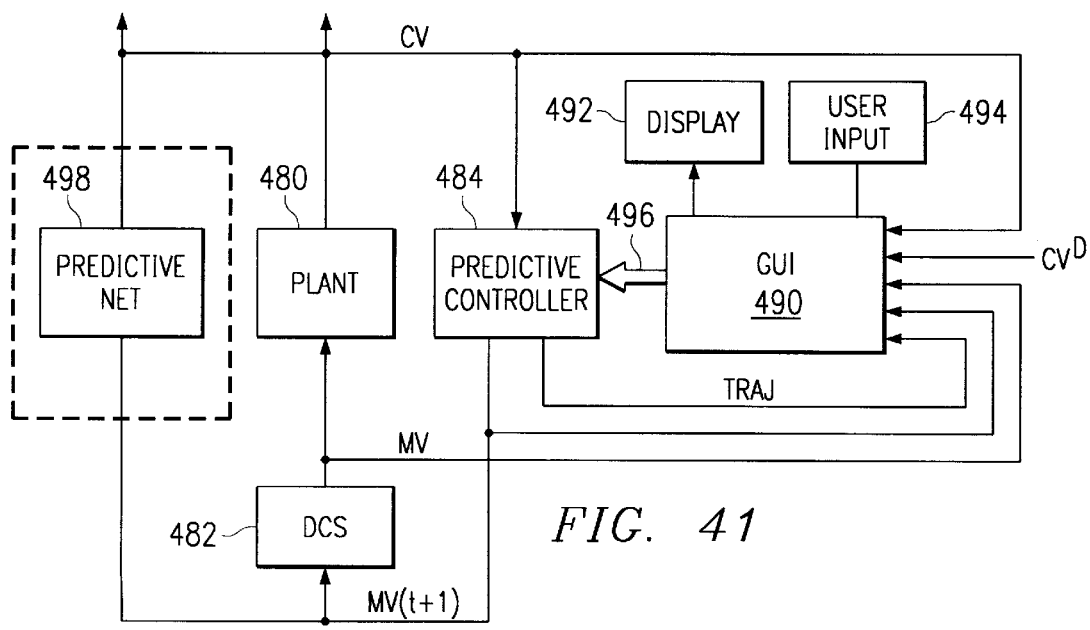
FIG. 41 illustrates a block diagram of a predictive control system with a GUI interface.
Figure 42:
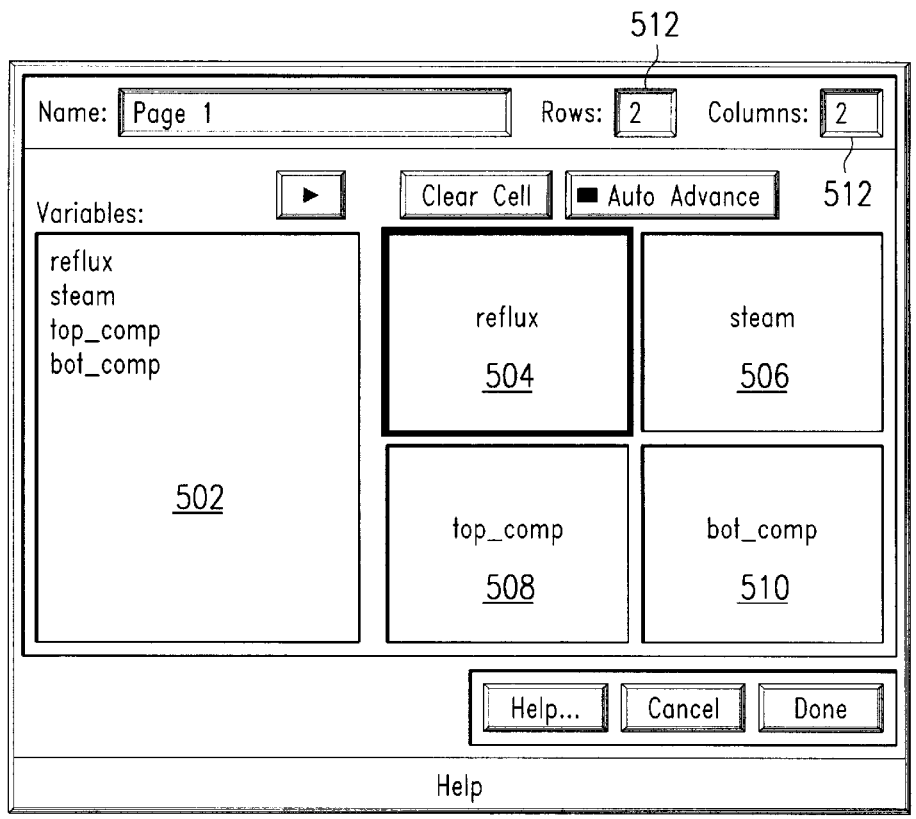

A corresponding controlled variable (CV) curve is illustrated in FIG. 42. In this figure, there is also a historical section 450 and a predictive section 452. In the output, there is provided therein a desired response 462 which basically is a step response. In general, the system is set to vary from an output value of 80.0 to an input value of approximately 42.0 which, due to dynamics, cannot be achieved in the real world. Various constraints are also illustrated with a upper fuzzy constraint at a line 464 and a lower fuzzy constraint at a line 466. The system will show in the historical section the actual value on a bold line 468 which illustrates the actual response of the plant, this noted above as being either a simulator or by the plant itself. It should be remembered that the user can actually apply the input MV while the plant is running. At the current time line 454, a predicted value is shown along a curve 470. This response is what is predicted as a result of the input varying in accordance with the trajectory of FIG. 41. In addition to the upper and lower fuzzy constraints, there are also provided upper and lower hard constraints and upper and lower frustum values, that were described hereinabove. These are constraints on the trajectory which are determined during optimization.

By allowing the user to view not only historical values but future predicted values during the operation of a plant or even during the simulation of a plant, the operator is now provided with information as to how the plant will operate during a desired change. If the operation falls outside of, for example, the upper and lower frustum of a desired operation, it is very easy for the operator to make a change in the desired value to customize this. This change is relatively easy to make and is made based upon future predicted behavior as compared to historical data.

Referring now to FIG. 41, there is illustrated a block diagram of a control system for a plant that incorporates the GUI interface. Basically, there is illustrated a plant 480 which has a distributed control system (DCS) 482 associated therewith for generating the MVs. The plant outputs the control variables (CV). A predictive controller 484 is provided which is basically the controller as noted hereinabove with respect to FIG. 2 utilized in a control environment for predicting the future values of the manipulated variables MV(t+1) for input to the DCS 482. This will generate the predicted value for the next step. The predictive controller requires basically a number of inputs, the MVs, the output CVs and various other parameters for control thereof. A GUI interface 490 is provided which is operable to receive the MVs, the CVs, the predicted manipulated variables MV(t+1) for t+1, t+2, t+3, ... t+n, from the predictive controller 484. It is also operable to receive a desired control variable $CV^D$. The GUI interface 490 will also interface with a display 492 to display information for the user and allow the user to input information therein through a user input device 494, such as a mouse or pointing device. The predictive controller also provides to the GUI interface 490 a predicted trajectory, which constitutes at one point thereof MV(t+1). The user input device 494, the display 492 and the GUI interface 490 are generally portions of a software program that runs on a PC, as well as the predictive controller 484.

In operation, the GUI interface 490 is operable to receive all of the information as noted above and to provide parameters on one or more lines 496 to the predictive controller 484 which will basically control the predictive controller 484. This can be in the form of varying the upper and lower constraints, the desired value and even possibly parameters of the identifying model. The model itself could, in this manner, be modified with the GUI interface 490.

The GUI interface 490 allows the user to identify the model as noted hereinabove with respect to FIG. 39 and also allows the user to view the system in either simulation mode or in run time mode, as noted in FIG. 41. For the simulation mode, a predictive network 498 is provided which is operable to receive the values MV(t+1) and output a predicted control variable rather than the actual control variable. This is described hereinabove with reference to FIG. 2 wherein this network is utilized in primarily a predictive mode and is not utilized in a control mode. However, this predictive network must have the dynamics of the system model defined therein.

Referring now to FIGS. 42–45, there is illustrated a screen view which comprises the layout screen for displaying the variables, both input and output, during the simulation and/or run-time operation. In the view of FIG. 42, there is illustrated a set-up screen wherein four variables can be displayed: reflex, steam, top_comp, and bot_comp. These are displayed in a box 502. On the right side of the screen are displayed four boxes 504, 506, 508 and 510, for displaying the four variables. Each of the variables can be selected for which box they will be associated with. The boxes 504–510 basically comprise the final display screen during simulation. The number of rows and columns can be selected with boxes 512.

Figure 44:
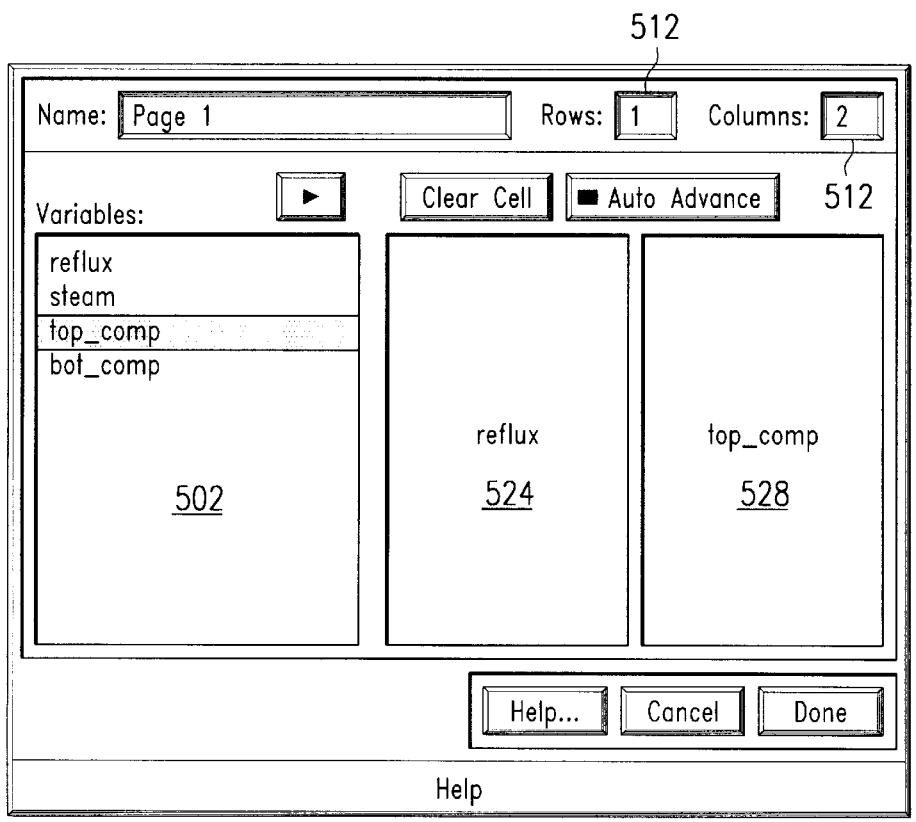
Figure 43:
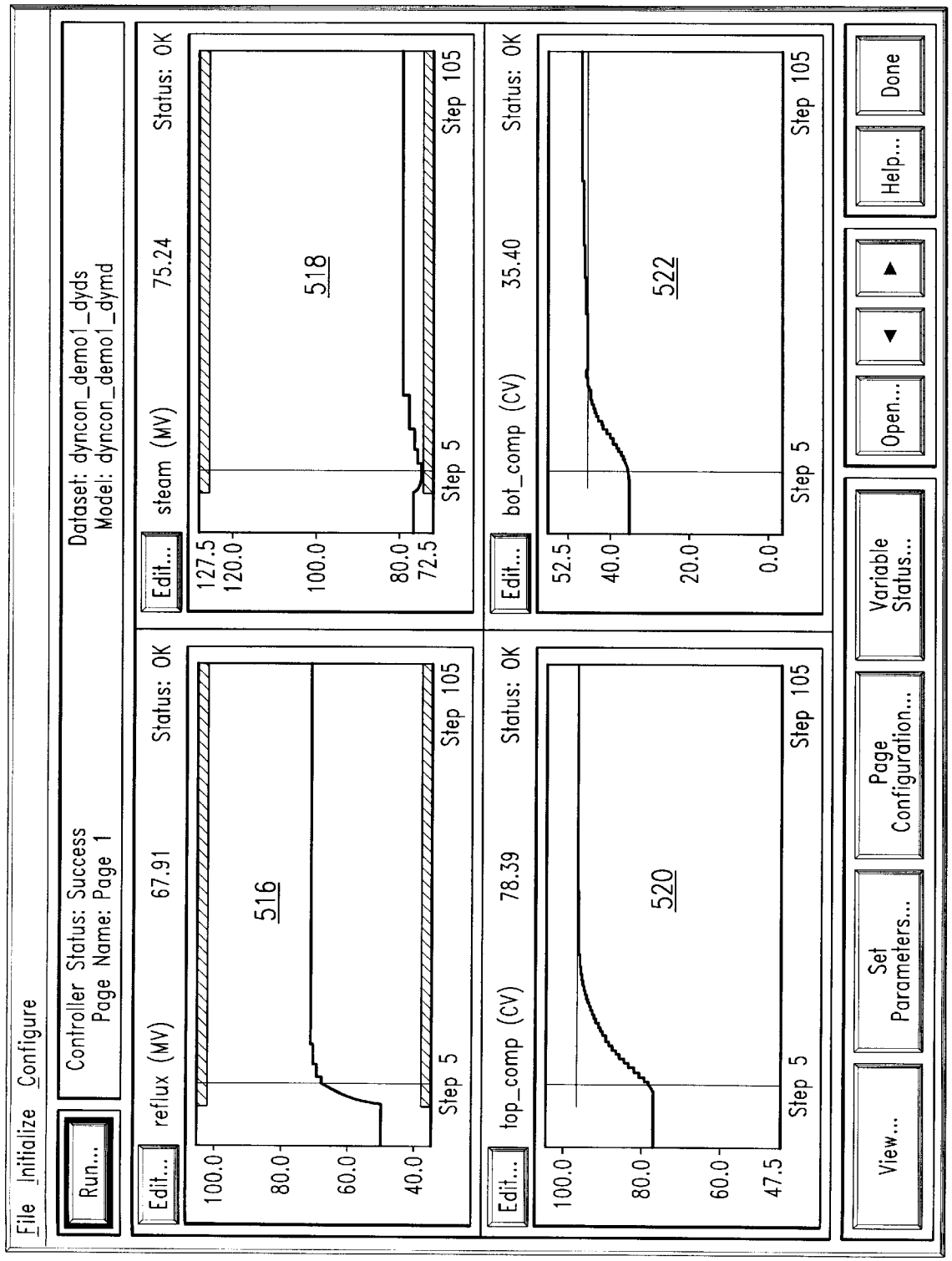
Figure 45:
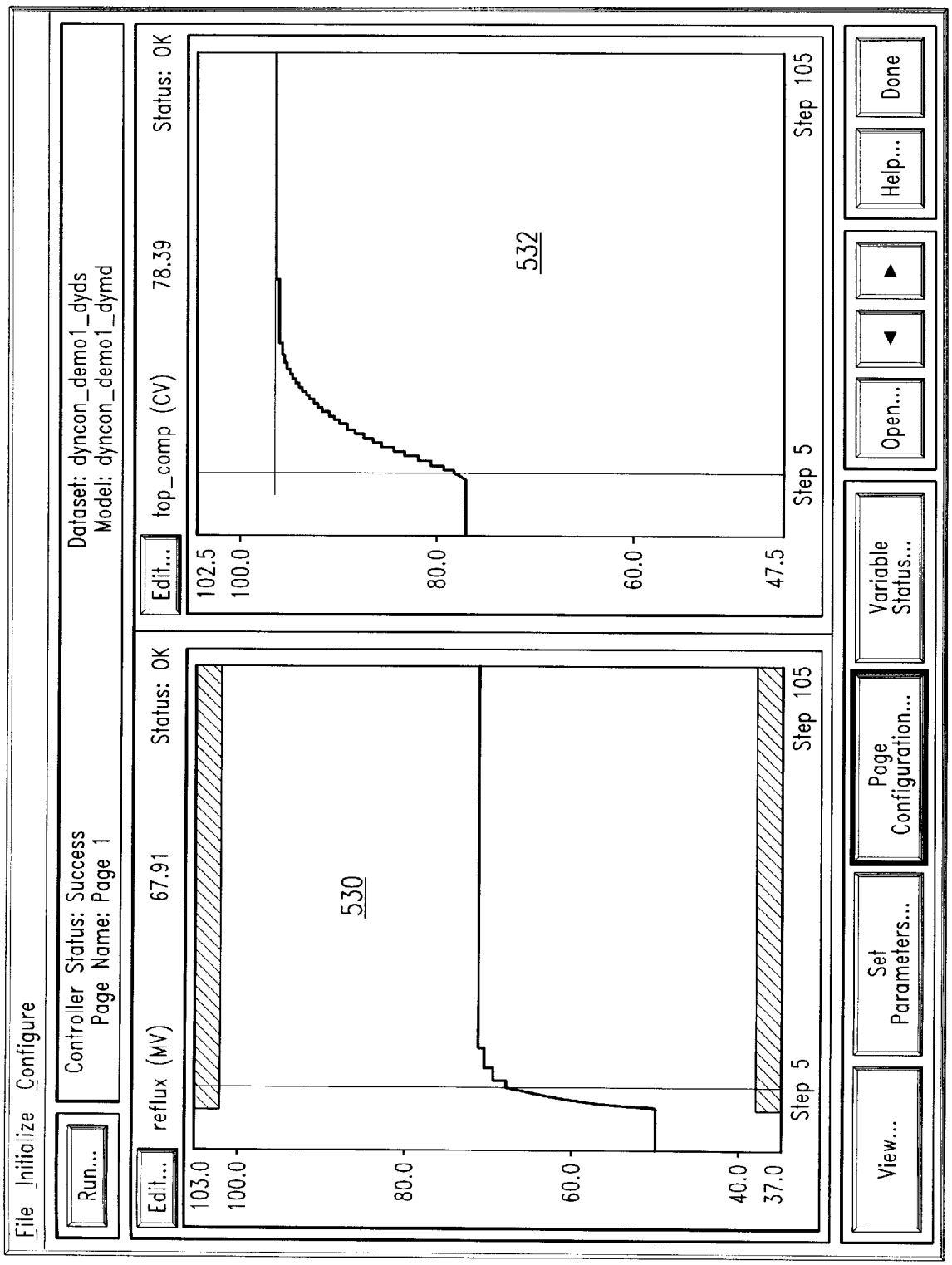

Referring now to FIG. 42, there is illustrated the screen that will result when the system is "stepped" for the four variables as selected in FIG. 43. This will result in four screens displaying the two MVs, reflex and steam, and the two CVs, top_comp and bot_comp. In some situations, there may be a large number of variables that can be displayed on a single screen; there could be as many as thirty variables displayed in the simulation mode as a function of time. In the embodiment of FIG. 44, there are illustrated four simulation displays 516, 518, 520 and 522, associated with boxes 504–510, respectively.

Referring now to FIG. 43, there is illustrated another view of the screen of FIG. 42 with only one row selected with the boxes 512 in two columns. This will result in two boxes 524 and 528 that will be disposed on the final display. It can be seen that the content of these two boxes, after being defined by the boxes 512, is defined by moving to the variable box 502 and pointing to the appropriate one of the variable names, which will be associated with the display area 524 or 528. Once the variables have been associated with the particular display, then the user can move to the simulation screen illustrated in FIG. 45, which only has two boxes 530 and 532 associated with the boxes 524 and 528 in FIG. 44. Therefore, the user can very easily go into the set-up screen of FIGS. 42 and 44 to define which variables will be displayed during the simulation process or during run-time execution.

Although the preferred embodiment has been described in detail, it should be understood that various changes, substitutions and alterations can be made therein without departing from the spirit and scope of the invention as defined by the appended claims.

What is claimed is:

1. A method for training a steady-state non-linear model of a plant, comprising the steps of:
    generating an input set of historical training data representative of the historical operation of the plant and having input data u(t) and output data y(t);
    identifying a linear dynamic model of the plant representing the dynamics of the plant for a given output variable of the plant;
    pre-filtering the historical input data through the dynamic model to impress the dynamics of the plant as defined by the linear dynamic model on the input data u(t); and
    training a non-linear model of the plant with the pre-filtered input data u(t) to provide a stored representation of the steady-state operation in the non-linear model associated with the given output variable.

2. The method of claim 1 wherein the step of training the non-linear model comprises training a non-linear neural network having an input layer, an output layer and a hidden layer for storing a learned representation of the plant and for mapping the input layer to the output layer through the learned representation of the plant, which learned representation of the plant comprises the steady-state operation of the plant.

3. The method of claim 1 wherein the step of identifying comprises identifying a linear dynamic model of the plant representing the dynamics of the plant in a defined portion of the input space.

4. The method of claim 3 wherein the step of training the non-linear model comprises training a non-linear model of the plant with the pre-filtered data to provide a stored representation of the steady-state operation in the non-linear model over a substantial portion of the input space.

5. The method of claim 1 wherein the step of identifying a linear model of a plant comprises:
    generating a set of dynamic data defining the dynamics of the plant over the defined portion of the input space over which the operation of the plant is linear;
    defining a linear dynamic model; and
    identifying the linear dynamic model utilizing the generated dynamic data over the defined portion of the input space such that the dynamics embodied within the identified linear dynamic model represent the dynamics of the plant over the entire input space.

6. The method of claim 5 and further comprising the step of normalizing the gain of the identified linear dynamic model to unity.

7. The method of claim 5 wherein the step of generating the set of dynamic data comprises performing a step test on the plant in a localized portion of input space from an initial steady-state value to a second value and then back to the initial steady-state value.

8. The method of claim 1 wherein the input set of historical training data has dynamics of the plant associated therewith.

9. A method for training a steady-state, non-linear model of a plant having multiple input variables and multiple output variables, comprised of the steps of:
    generating an input of historical training data representative of the historical operations of the plant and having input data u(t) and output data y(t);
    identifying a plurality of linear dynamic models, one for each output variable of the plant, each of which represents the dynamics of the plant for the given output variables of the plant;
    pre-filtering the historical input data for each of the input variables through each of the dynamic models to impress the dynamics of the plant for the associated output variable with the associated dynamic model on the input data u(t); and
    training a plurality of non-linear models in the plant, each non-linear model associated with one of the output variables, and each of the non-linear models filtered with the pre-filtered input data u(t) for the associated output variable to provide a stored representation of the steady-state operation of each of the output variables in the associated non-linear model.

10. The method of claim 9 and further comprising combining all of the non-linear models into a single combined model, such that a single multi-input multi-output model is provided, with each of the outputs having associated therewith one of the non-linear models.

11. A method for training a steady-state model, the model having an input and an output and a mapping layer for mapping the input to the output through a stored representation of a plant, comprising:
    providing a training data set having a set of input data u(t) and target output data y(t) representative of the operation of a plant;
    training the model with a predetermined training algorithm; and
    constraining the training algorithm to maintain the sensitivity of the output with respect to the input substantially within user defined bounds.

12. The method of claim 11, wherein the model comprises a neural network having an input layer, an output layer and a hidden layer that provides the mapping layer operation.

13. The method of claim 11, wherein the training algorithm comprises a gradient based training algorithm for generating an error term during the operation of the training algorithm and minimizing this error term and wherein the step of constraining the training algorithm comprises minimizing the error term substantially within the user defined bounds.

14. The method of claim 13, wherein the training algorithm comprises a back propagation algorithm.

15. The method of claim 13, wherein the training algorithm minimizes an error E in accordance with the following:

$$E = \sum_{l=1}^{P} (y^p - y(t))^2$$

where P is the number of training patterns, $y^P(t)$ comprises the output of the model and y(t) comprises the training data set.

16. The method of claim 15, wherein the sensitivity of the outputs with respect to the inputs during training are constrained between a first lower sensitivity limit and a second upper sensitivity limit.

17. The method of claim 16, wherein the upper and lower sensitivity limits are hard constraints.

18. The method of claim 16, wherein the constraints are soft limits wherein a penalty factor is attributed to the training algorithm when the upper and lower limits of sensitivity are violated.

19. The method of claim 18, wherein the back propagation algorithm with soft constraints is in accordance with the following relationship:

$$E = \sum_{t=1}^{P} \left(\vec{y}^p(t) - \vec{y}(t)\right)^2 +$$

$$\lambda \sum_{t=1}^{P} \left( H\big(G_l(\vec{u}(t)) - G(\vec{u}(t))\big) + H\big(G(\vec{u}(t)) - G_h(\vec{u}(t))\big) \right)$$

where H represents a predetermined non-negative penalty function for violating the constraints, $\lambda$ represents a user defined weighting factor, $G_l$ represents a lower sensitivity limit, $G_h$ represents an upper sensitivity limit, G represents the sensitivity of the outputs with respect to the inputs.

20. The method of claim 15, wherein the sensitivity comprises the gain of the model.

21. The method of claim 11, wherein the sensitivity is defined as a sensitivity of each output with respect to each input.

22. A method for developing a linear dynamic model of a plant, comprising the steps of:
creating a linear model for predicting a dynamic response $\hat{y}(t)$ from an input u(t) and having a dynamic gain $k_d$, which linear model can define the dynamic response of the plant;
generating a training data set of dynamic input data $u_d(t)$ and output data $y_d(t)$;
providing a user defined sensitivity value representing the sensitivity of the output of the plant with respect to the input of the plant at steady-state;
training the linear model on the training data set with a predetermined training algorithm; and
constraining the training algorithm with a scaled level of the difference between the dynamic gain and the user defined sensitivity such that an error generated with the training algorithm will increase as the difference between the dynamic gain and the user defined sensitivity increases.

23. The method of claim 22, wherein the training data set is generated over a localized region of the input data space.

24. The method of claim 23, wherein the step of generating the training data comprises step testing the plant by stepping the data from a steady-state value at $u_i(t)$ for each value of the input.

25. The method of claim 22, wherein the step of providing a user defined sensitivity comprises providing a user defined sensitivity over the entire input space.

26. The method of claim 25, wherein the step of providing the user defined sensitivity comprises providing a non-linear predictive network that represents a predictive model of the plant and which has a steady-state gain $K_{ss}$, and wherein the average value of the gain $K_{ss}$, $K_{ss}'$, represents the user defined sensitivity.

27. The method of claim 22, wherein the predetermined training algorithm comprises a gradient based training algorithm.

28. The method of claim 27, wherein the step of providing the user defined sensitivity comprises providing a non-linear network that represents a predictive model of the plant and which has a steady-state gain $K_{ss}'$, and wherein the average value of the gain $K_{ss}$, $K_{ss}'$, represents the user defined sensitivity.

29. The method of claim 28, wherein the training algorithm and the step of constraining operate in accordance with the following relationship:

$$J = \lambda(k_d - K_{ss}')^2 + \sum_{l=t_i}^{t_f} \left(\hat{y}(t) - \vec{y}(t)\right)^2$$

where J=the error that is to be minimized and $\lambda$=a user defined weighting factor where $\hat{y}(t)$ is the predicted value and $\overline{y}(t)$ is y(t).

30. The method of claim 22, wherein the step of creating the linear model creates a linear model in accordance with the following relationship:

$$\hat{y}(t) = -a_1 \hat{y}(t-1) + -a_2 \hat{y}(t-2) + b_1 u(t-d-1) + b_2 u(t-d-2)$$

where the dynamic gain $k_d$ is defined by the relationship:

$$k_d = \frac{b_1 + b_2}{1 + a_1 + a_2}$$

31. The method of claim 30, wherein the gain $k_d$ for the linear network is set equal to unity after training by varying the values $b_1$ and $b_2$ in the gain relationship.

32. A method for determining the dead-time d between an input variable u(t) to a plant and an output variable y(t) from the plant, comprising the steps of:
providing a historical data set of input variables u(t) for a given output variable y(t);
defining a minimum dead-time $d_i$,min and a maximum dead-time $d_i$,max;
varying the value of $d_i$ from $d_i$,min to $d_i$,max for each input variable $u_i(t-d_i)$;

determining the strength of the statistical relationship between the input variable u(t) and the output variable y(t) for each value of i as $d_i$ varies from $d_{imin}$ to $d_{imax}$; and select the value of j for $d_i$ as the $d_i$ value having the strongest statistical relationship for the given input variable.

33. The method of claim 32 wherein the step of determining determines the statistical independence of y(t) for a given value of $u_i(t-d_i)$ as $d_i$ varies from $d_i$,min—$d_i$,max, with the one of the $u_i(t-d_i)$ values for $d_i$ corresponding to the lowest statistical dependent comprising the strongest relationship value of $u_i(t-d_i)$.

34. The method of claim 33 wherein the step of determining utilizes mutual information (MI) in accordance with the following relationship:

$$MI = \sum_t p(x_1(t), x_2(t)) \log\left(\frac{p(x_1(t), x_2(t))}{p(x_1(t))p(x_2(t))}\right)$$

wherein $x_1(t)$ represents $u_i(t-d_j)$ and $x_2(t)$ represents y(t).

35. The method of claim 34, wherein MI is computed by estimating the probability distribution of a given data set of u(t) and y(t) utilizing a binning method wherein a grid with two dimensions, $u_i(t-d_i)$ and y(t), is divided into a fixed number of divisions.

36. The method of claim 32 wherein a plurality of output variables y(t) and $u_i(t)$ and the step of determining the strength of the statistical relationship comprises determining the strength and the statistical between each of the input variables u(t) and each of the output variables y(t).

* * * * *